(12) United States Patent
Beith et al.

(10) Patent No.: US 12,315,057 B2
(45) Date of Patent: May 27, 2025

(54) AVATAR FACIAL EXPRESSIONS BASED ON SEMANTICAL CONTEXT

(71) Applicant: QUALCOMM Incorporated, San Diego, CA (US)

(72) Inventors: Scott Beith, Carlsbad, CA (US); Suzana Arellano, San Diego, CA (US); Michel Adib Sarkis, San Diego, CA (US); Matthew Fischler, San Diego, CA (US); Ke-Li Cheng, San Diego, CA (US); Stephane Villette, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/930,244

(22) Filed: Sep. 7, 2022

(65) Prior Publication Data

US 2024/0078732 A1    Mar. 7, 2024

(51) Int. Cl.
*G06T 13/40* (2011.01)
*G06F 3/01* (2006.01)
*G06V 20/40* (2022.01)
*G06V 40/16* (2022.01)

(52) U.S. Cl.
CPC ............. *G06T 13/40* (2013.01); *G06F 3/012* (2013.01); *G06V 20/41* (2022.01); *G06V 40/174* (2022.01)

(58) Field of Classification Search
None
See application file for complete search history.

(56) References Cited

U.S. PATENT DOCUMENTS

| | | | |
|---|---|---|---|
| 9,563,265 B2 | 2/2017 | You et al. | |
| 11,113,859 B1 | 9/2021 | Xiao et al. | |
| 11,218,666 B1 | 1/2022 | Haas et al. | |
| 11,276,215 B1* | 3/2022 | Grossinger | ........... G06T 19/006 |
| 2013/0257876 A1 | 10/2013 | Davis | |
| 2013/0345840 A1* | 12/2013 | Lempel | ................. G06F 16/683 |
| | | | 700/94 |
| 2017/0039750 A1 | 2/2017 | Tong et al. | |
| 2017/0370744 A1* | 12/2017 | Miyajima | .............. G01C 21/34 |
| 2018/0025506 A1 | 1/2018 | Li et al. | |
| 2020/0279553 A1* | 9/2020 | McDuff | .................. G10L 25/78 |
| 2021/0173206 A1* | 6/2021 | Das | .................... G02B 27/0172 |

(Continued)

FOREIGN PATENT DOCUMENTS

| CN | 107944542 A | 4/2018 |
|---|---|---|
| CN | 110930481 A | 3/2020 |
| CN | 111656406 A | 9/2020 |

OTHER PUBLICATIONS

Calix et al. (Actor level emotion magnitude prediction in text and speech, Multimed Tools Appl, 2013) (Year: 2013).*

(Continued)

*Primary Examiner* — Kyle Zhai
(74) *Attorney, Agent, or Firm* — QUALCOMM Incorporated; Espartaco Diaz Hidalgo

(57) ABSTRACT

A device includes a memory and one or more processors configured to process sensor data to determine a semantical context associated with the sensor data. The one or more processors are also configured to generate adjusted face data based on the determined semantical context and face data. The adjusted face data includes an avatar facial expression that corresponds to the semantical context.

30 Claims, 21 Drawing Sheets

(56) References Cited

U.S. PATENT DOCUMENTS

| | | | |
|---|---|---|---|
| 2021/0334595 A1 | 10/2021 | Berlin et al. | |
| 2022/0005246 A1 | 1/2022 | Nadimpalli et al. | |
| 2022/0171960 A1* | 6/2022 | Nelson | A63F 13/42 |
| 2022/0343576 A1* | 10/2022 | Marey | G10L 15/1815 |
| 2023/0083897 A1* | 3/2023 | Yang | G06F 9/451 |
| | | | 345/473 |
| 2024/0078731 A1 | 3/2024 | Beith et al. | |

OTHER PUBLICATIONS

Tang et al. (Humanoid Audio-Visual Avatar With Emotive Text-to-Speech Synthesis, vol. 10, No. 6, IEEE, 2008) (Year: 2008).*

International Search Report and Written Opinion—PCT/US2023/069932—ISA/EPO—Sep. 20, 2023.

Shahriar S., et al., "Audio-Visual Emotion Forecasting: Characterizing and Predicting Future Emotion Using Deep Learning", 2019 14th IEEE International Conference on Automatic Face & Gesture Recognition (FG 2019), May 14, 2019, 7 Pages, XP033576059, abstract, section IV, figure 1.

Yang et al., "Self-Supervised Speech Pre-Training and Representation Learning Toolkit", s3prl.gihub.io/s3prl/, pp. 1-7.

Hsu et al., "HuBERT: Self-Supervised Speech Representation Learning by Masked Prediction of Hidden Units", Jun. 14, 2021, pp. 1-10.

Zhou et al., "Pose Controllable Talking Face Generation by Implicitly Modularized Audio-Visual Representation", https://hangz-nju-cuhk.github.io/projects/PC-AVS, printed Nov. 2, 2023, pp. 1-3.

Yang et al., "SUPERB: Speech processing Universal PERformance Benchmark", Oct. 15, 2021, pp. 1-6.

Suwajanakorn et al., "Synthesizing Obama: Learning Lip Sync from Audio", ACM Transactions on Graphics, vol. 36, No. 4, Article 95. Publication date: Jul. 2017, pp. 95:1-95:13.

Schneider et al., "WAV2VEC: Unsupervised Pre-Training for Speech Recognition", Sep. 11, 2019, pp. 1-9.

Morise et al., "WORLD: A Vocoder Based High-Quality Speech Synthesis System for Real-Time Applications", IEICE Trans. Inf. & Syst., vol. E99-D, No. 7, Jul. 2016, pp. 1877-1884.

Liu "Azure Neural Text-to-Speech Extended To Support Lip Sync With Viseme", May 19, 2021, pp. 1-6.

"Chip Shot: Intel Injects Laughter into Mobile Messaging" Intel Newsroom, Jun. 19, 2014, pp. 1-2.

Richard et al., "Audio- and Gaze-driven Facial Animation of Codec Avatars", Computer Vision Foundation, 2021, pp. 41-50.

Light Stage—Wikipedia, last edited May 18, 2021, pp. 1-2.

* cited by examiner

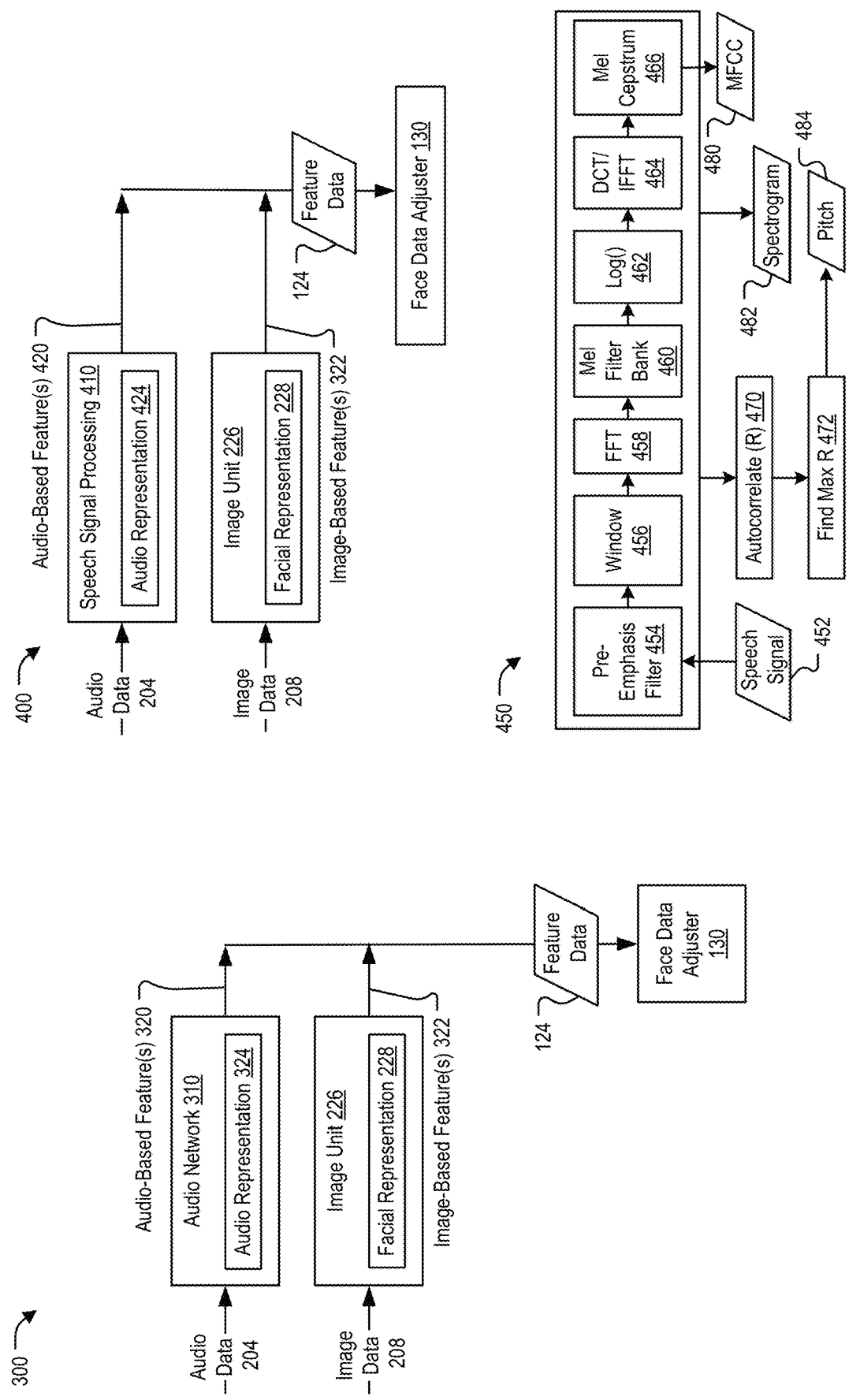

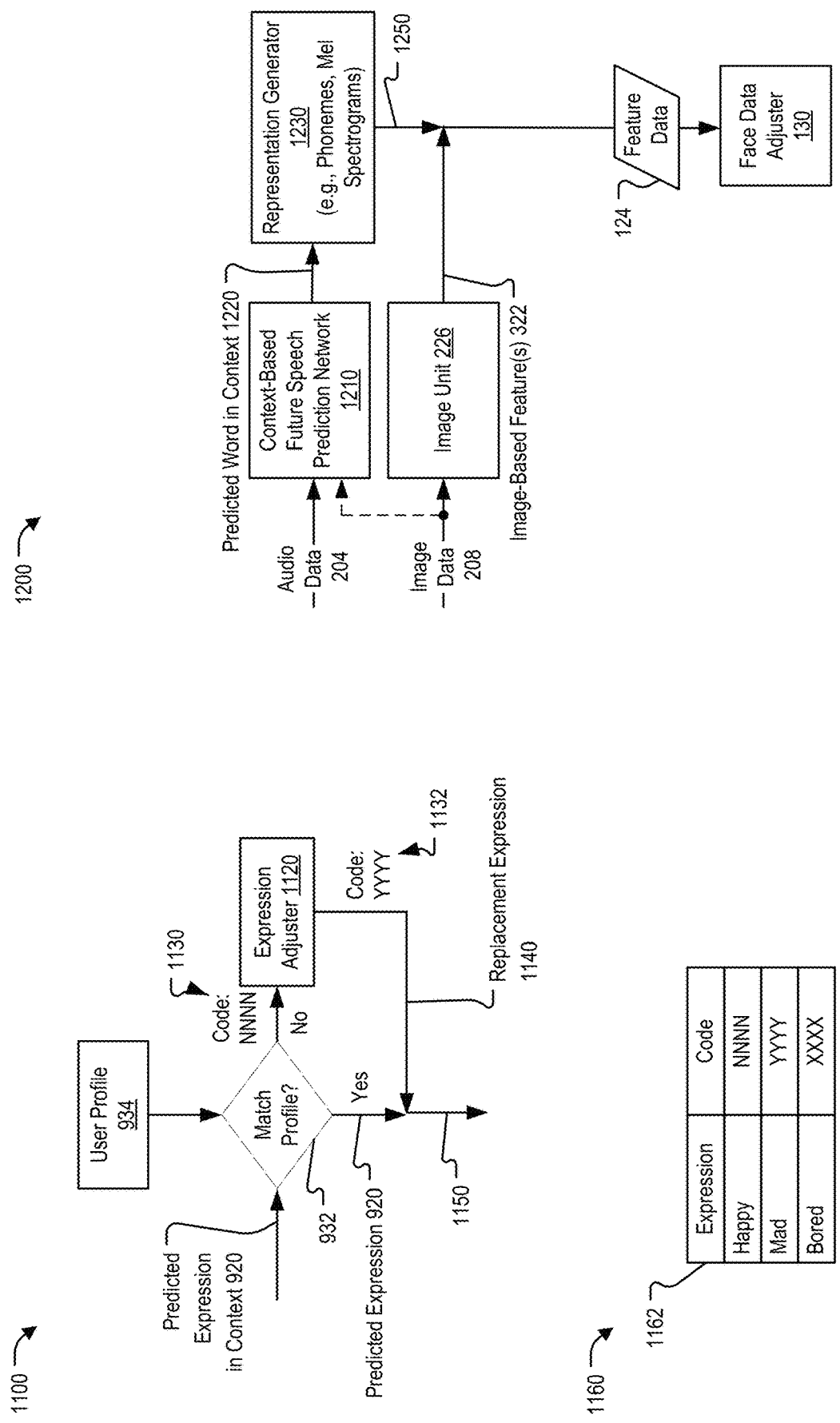

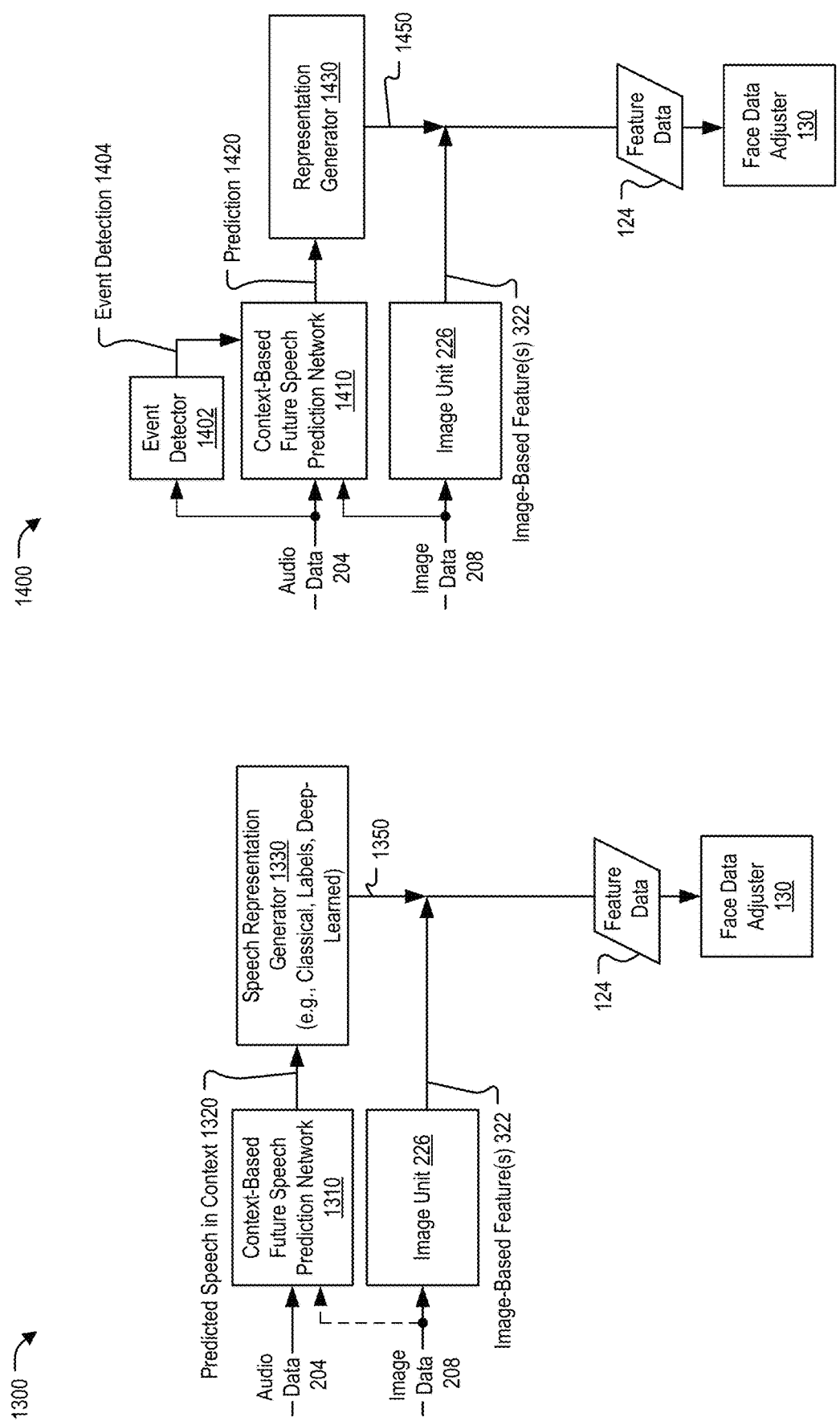

AVATAR FACIAL EXPRESSIONS BASED ON SEMANTICAL CONTEXT

I. FIELD

The present disclosure is generally related to generating avatar facial expressions.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One popular use of such devices is to enable users to interact with one or more other users, or computer-generated users, via avatars. For example, an avatar can represent a user in a multi-player online game, virtual conference, or other applications in which participants can interact with each other. Although in some cases avatars can be used to emulate the appearance of the users that the avatars represent, such as photorealistic avatars, in other cases an avatar may not emulate a user's appearance and may instead have the appearance of a fictional character or a fanciful creature, as non-limiting examples.

Regardless of whether or not an avatar emulates a user's appearance, it is typically beneficial to increase the perceived realism of the avatar, such by having the avatar accurately convey emotional aspects associated with the user to participants that are interacting with the avatar. For example, if a photorealistic avatar's facial expressions do not represent the user's face with sufficient accuracy, participants viewing the avatar can become unsettled due to experiencing the avatar as almost, but not quite, lifelike, a phenomenon that has been referred to as the "uncanny valley." The experience of participants interacting with a user's avatar, whether photorealistic or fanciful, can thus be improved by improving the accuracy with which the avatar conveys the expressions and emotions of the user.

III. SUMMARY

According to one implementation of the present disclosure, a device includes a memory configured to store instructions. The device also includes one or more processors configured to process sensor data to determine a semantical context associated with the sensor data. The one or more processors are also configured to generate adjusted face data based on the determined semantical context and face data. The adjusted face data includes an avatar facial expression that corresponds to the semantical context.

According to another implementation of the present disclosure, a method of avatar generation includes processing, at one or more processors, sensor data to determine a semantical context associated with the sensor data. The method also includes generating, at the one or more processors, adjusted face data based on the determined semantical context and face data. The adjusted face data includes an avatar facial expression that corresponds to the semantical context.

According to another implementation of the present disclosure, a non-transitory computer-readable medium includes instructions that, when executed by one or more processors, cause the one or more processors to process sensor data to determine a semantical context associated with the sensor data. The instructions, when executed by the one or more processors, also cause the one or more processors to generate adjusted face data based on the determined semantical context and face data. The adjusted face data includes an avatar facial expression that corresponds to the semantical context.

According to another implementation of the present disclosure, an apparatus includes means for processing sensor data to determine a semantical context associated with the sensor data. The apparatus also includes means for generating adjusted face data based on the determined semantical context and face data. The adjusted face data includes an avatar facial expression that corresponds to the semantical context.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 3 is a block diagram of particular illustrative aspect of components that can be included in a system configured to generate adjusted face data corresponding to an avatar facial expression based on audio data, in accordance with some examples of the present disclosure.

FIG. 4 is a block diagram of another illustrative aspect of components that can be included in a system configured to generate adjusted face data corresponding to an avatar facial expression based on audio data, in accordance with some examples of the present disclosure.

FIG. 11 is a diagram of another illustrative aspect of components that can be included in a system configured to generate adjusted face data corresponding to an avatar facial expression in conjunction with a user profile, in accordance with some examples of the present disclosure.

FIG. 12 is a block diagram of a particular illustrative aspect of components that can be included in a system configured to generate adjusted face data corresponding to an avatar facial expression based on speech prediction, in accordance with some examples of the present disclosure.

FIG. 13 is a block diagram of another illustrative aspect of components that can be included in a system configured to generate adjusted face data corresponding to an avatar facial expression based on speech prediction, in accordance with some examples of the present disclosure.

FIG. 14 is a block diagram of another illustrative aspect of components that can be included in a system configured to generate adjusted face data corresponding to an avatar facial expression based on speech prediction, in accordance with some examples of the present disclosure.

V. DETAILED DESCRIPTION

Figure 1:
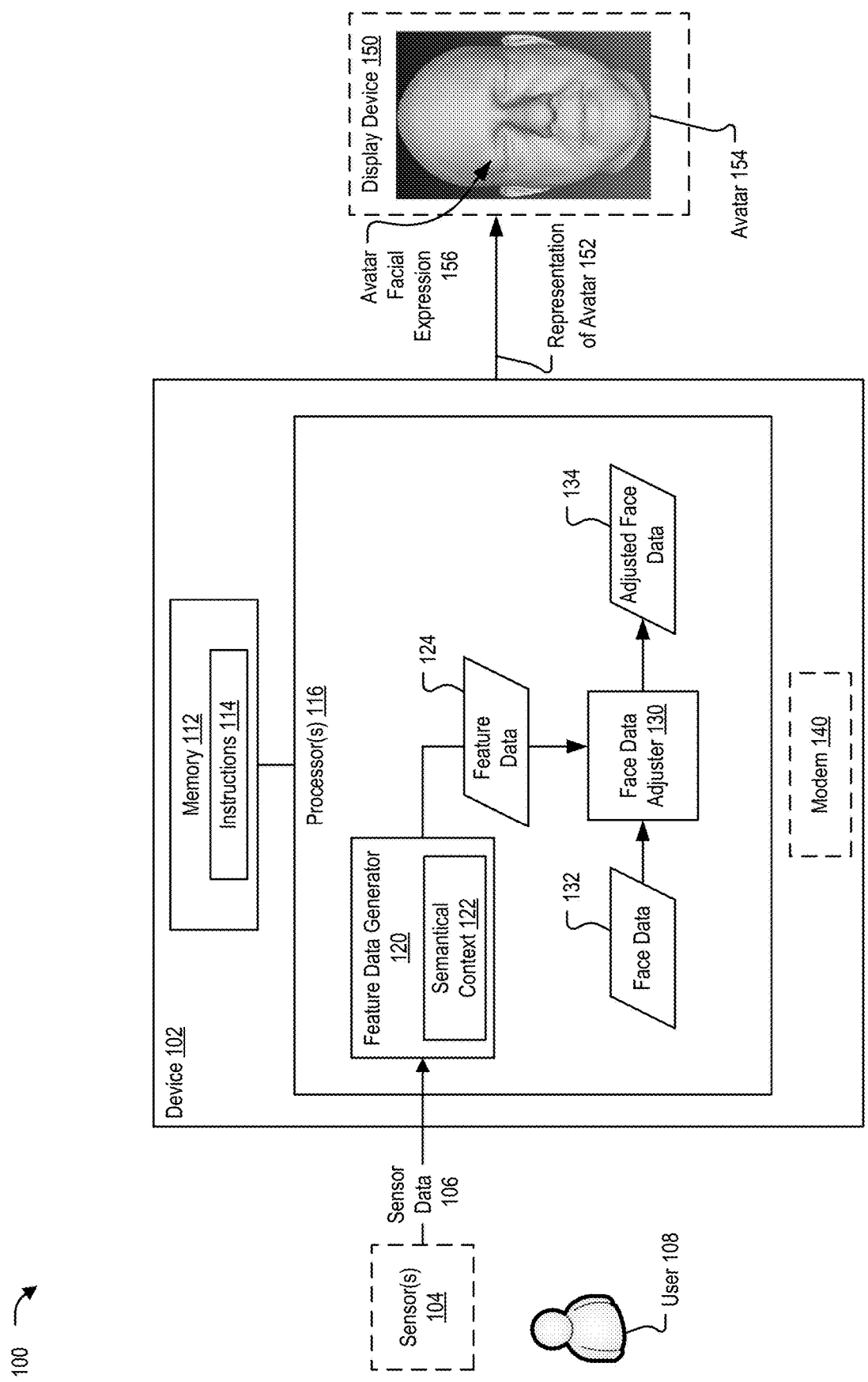
FIG. 1 is a block diagram of a particular illustrative aspect of a system configured to generate adjusted face data corresponding to an avatar facial expression based on a semantical context, in accordance with some examples of the present disclosure.

Systems and methods of generating avatar facial expressions are disclosed. Because interactions with an avatar whose facial expressions do not accurately convey aspects such as emotions can be unsettling, such avatars impair a user experience. By improving the perceived realism of an avatar, such as by improving the avatar's ability to convey emotional aspects and facial expressions of the user that is represented by the avatar, an experience of users that interact with the avatar can be improved.

Conventional camera-based avatar solutions are typically unable to accurately mimic the characteristics and movements of a human face. For example, some camera-based solutions require extensive enrollment (e.g., requiring the user to provide a series of pictures or video) of the user's face as a starting point for re-creating the user's face for use as an avatar. However, even after enrollment, such camera-based solutions are typically unable to provide sufficient realism in reproducing the user's actual facial behaviors because the previously collected enrollment data cannot account for the many forms the user's real face might make during the myriad of social situations, emotional reactions, facial expressions, etc. that the user may exhibit.

In other conventional solutions, cameras attached to a head-mounted display (HMD) point downward and capture characteristics, movements, and behaviors of portions of the face in an attempt to animate the avatar. However, because the cameras are not able to capture all aspects of the user's face due to the limited view of the cameras, the resulting avatar typically lacks sufficient realism.

The disclosed systems and methods enable creation of a more realistic representation of the user's facial behaviors than the above-described conventional solutions. For example, the disclosed systems and methods enable improved realism for facial parts (e.g., eyes, nose, skin, lips, etc.), facial expressions (e.g., smile, laugh, cry, etc.), and emotional states which involve multiple parameters of the face to be in concert to convey the accurate emotion (e.g., happy, sad, angry, etc.).

According to some aspects, sensor data associated with a user, such as audio data representing the user's speech, image data representing one or more portions of the user's face, motion data corresponding to movement of the user or the user's head, or a combination thereof, is used to determine a semantical context associated with such data. For example, the semantical context can correspond to the meaning of a word, phrase, or sentence spoken (or predicted to be spoken) by the user, which may be used to inform the avatar's facial expression. In some examples, the semantical context can be based on the characteristics of a conversation that the user is participating in, such as the type of relationship between the conversation participants (e.g., business, friends, family, parent/child, etc.), the social context of the conversation (e.g., professional, friendly, etc.), or both.

In some examples, the semantical context can correspond to an emotion that is detected based on the user's speech, based on image data of the user's face, or a combination of both. In some examples, semantical context can be associated with audio events detected in the audio data, such as the sound of breaking glass in the vicinity of the user.

According to some aspects, the facial expression of the avatar is modified to more accurately represent the user's emotions or expressions based on the semantical context. For example, facial data representing the avatar can be generated from images of portions of the user's face captured by cameras of a HMD, but as explained above, such facial data may be inadequate for generating a sufficiently realistic facial expression for the avatar. However, the facial data can be adjusted based on feature data that is derived from the sensor data, resulting in the avatar facial expression being more realistic in light of the semantical context.

According to some aspects, the disclosed systems and methods enable prediction of a future expression or emotion of the user based on the semantical context. For example, a future speech prediction of a most probable word that will be spoken by the user can be generated, which may enable prediction of facial expression involved with pronouncing the word in addition to prediction of an emotional tone associated with the meaning of the word. As another example, a future emotion or expression of the user can be predicted based on a detected audio event, such as the sound of glass breaking or a car horn. Accurate future predictions of facial expressions, emotions, etc., enable transitions between avatar expressions to be generated with reduced latency and improved accuracy.

Improving the realism of the avatar's facial expressions improves the user experience of participants interacting with the avatar. In addition, future predictions of speech, expressions, or emotions can improve accuracy and reduce latency associated with generating the avatar facial expressions. Other benefits and examples of applications in which the disclosed techniques can be used are described in further detail below and with reference to the accompanying figures.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 116 of FIG. 1), which indicates that in some implementations the device 102 includes a single processor 116 and in other implementations the device 102 includes multiple processors 116. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where," and the term "based on" may be used interchangeably with "at least partially based on," "based at least partially on," or "based in part on." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc.

Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to generate data corresponding to an avatar facial expression is disclosed. The system 100 includes a device 102 that includes a memory 112 and one or more processors 116. In some implementations, the device 102 corresponds to a computing device such as mobile phone, laptop computer, server, etc., a headset or other head mounted device, or a vehicle, as illustrative, non-limiting examples.

The one or more processors 116 include a feature data generator 120 and a face data adjuster 130. According to some implementations, one or more of the components of the one or more processors 116 can be implemented using dedicated circuitry. As non-limiting examples, one or more of the components of the one or more processors 116 can be implemented using a field programmable gate array (FPGA), an application-specific integrated circuit (ASIC), etc. According to another implementation, one or more of the components of the one or more processors 116 can be implemented by executing instructions 114 stored in the memory 112. For example, the memory 112 can be a non-transitory computer-readable medium that stores the instructions 114 executable by the one or more processors 116 to perform the operations described herein.

The one or more processors 116 are configured to process sensor data 106 to generate feature data 124. To illustrate, the feature data generator 120 is configured to process the sensor data 106 to determine a semantical context 122 associated with the sensor data 106. As used herein, a "semantical context" refers to one or more meanings or emotions that can be determined based on, or predicted from, the sensor data 106. In an illustrative example in which the sensor data 106 includes audio data, the semantical context 122 is based on a meaning of speech represented in the audio data, based on an emotion associated with speech represented in the audio data, based on an audio event detected in the audio data, or a combination thereof. In some implementations, the sensor data 106 includes image data (e.g., video data), and the semantical context 122 is based on an emotion associated with an expression on a user's face represented in the image data. In some examples, the sensor data 106 includes motion sensor data, and the semantical context 122 is based on the motion sensor data. Examples of determining the semantical context 122 based on audio data, image data, motion data, or a combination thereof, are described further with reference to FIG. 2.

The feature data 124 includes information that enables the face data adjuster 130 to adjust one or more aspects of an expression of an avatar 154. In some examples, the feature data 124 indicates an expression condition, an emotion, an audio event, or other information that conveys, or that is based on, the semantical context 122. In some examples the feature data 124 includes code, audio features, speech labels/phonemes, audio event labels, emotion indicators, expression indicators, or a combination thereof, as described in further detail below.

In some implementations, the feature data generator 120 determines the semantical context 122 based on processing the sensor data 106 and generates the feature data 124 based on the semantical context 122. To illustrate, in some examples, the feature data generator 120 includes an indicator or encoding of the semantical context 122 in the feature data 124. In other examples, the feature data generator 120 generates an expression condition (e.g., facial expression information, emotion data, etc.) based on the semantical context 122 and includes the expression condition in the feature data 124. However, in other implementations, the feature data generator 120 does not explicitly determine the semantical context 122. For example, the feature data generator 120 can include one or more feature generation models that are configured to bypass explicitly determining the semantical context 122 and instead directly map the sensor data 106 to values of feature data 124 that are appropriate for the semantical context 122 that is implicit in the sensor data 106. As an example, the feature data generator 120 may process audio data that represents the user's voice having a happy tone, and as a result the feature data generator 120 may output the feature data 124 that encodes or indicates a facial expression associated with conveying happiness, without explicitly determining that the semantical context 122 corresponds to "happy."

The one or more processors 116 are configured to generate adjusted face data 134 based on the feature data 124. For example, the face data adjuster 130 can receive face data 132, such as data corresponding to a rough mesh that represents a face of a user 108 and that is used as a reference for generation of a face of the avatar 154. In some implementations, the face data 132 is generated based on image data from one or more cameras that capture portions of the face of the user 108, and the face of the avatar 154 is generated to substantially match the face of the user 108, such as a photorealistic avatar. Alternatively, the face of the avatar 154 can be based on the face of the user 108 but may include one or more modifications (e.g., adding or removing facial hair or tattoos, changing hair style, eye color, or skin tone, etc.), such as based on a user preference. In some implementations in which the avatar 154 corresponds to a user-selected virtual avatar, such as a fanciful computer-generated character or creature, the face data 132 for the avatar 154 can be generated by the one or more processors 116 (e.g., via a gaming engine) or retrieved from the memory 112.

The adjusted face data 134 corresponds to an avatar facial expression 156 that is based on the semantical context 122. For example, although the face data 132 may not include sufficient information to accurately reproduce expressions or emotions exhibited by the user 108, the feature data 124 generated based on the sensor data 106 can provide additional information regarding the expressions or emotions of the user 108. For example, the feature data 124 may directly include an indication of the semantical context 122 or may include expression data, emotion data, or both, that is based on the semantical context 122.

In some implementations, the face data adjuster 130 generates the adjusted face data 134 by modifying the face data 132 based on the feature data 124. In some implementations, the face data adjuster 130 generates the adjusted face data 134 by merging the face data 132 with facial expression data corresponding to the feature data 124. In some implementations, such as described with reference to FIGS. 15-19, the face data adjuster 130 includes a neural network with an encoder portion that processes the face data 132 and that is coupled to a decoder portion. The output of the encoder portion is combined with the feature data 124 at the decoder portion, such as via concatenation or fusion in latent space, which results in the decoder portion generating the adjusted face data 134.

During operation, in a particular example, the feature data generator 120 processes the user's voice, speech, or both, and detect emotions and behaviors that can correspond to the semantical context 122. Such emotions and behaviors can be encoded in the feature data 124 and used by the face data adjuster 130 to generate the adjusted face data 134. For example, the face data adjuster 130 can cause the adjusted face data 134 to represent or express an emotion or behavior indicated in the feature data 124. To illustrate, when a laugh of the user 108 has been identified, the face data adjuster 130 can cause the mouth of the avatar 154 to smile bigger, cause the eyes to tighten, add or enlarge dimples, etc. In another particular example, the semantical context 122 can correspond to a type of relationship (e.g., familial, intimate, professional, formal, friendly, etc.) between the user 108 and another participant engaged in a conversation with the user 108, and the face data adjuster 130 can cause the avatar facial expression 156 to exhibit one or more properties that are appropriate to the type of relationship (e.g., by increasing attentiveness, reducing or amplifying emotional expression, etc.). Other examples of generating the adjusted face data 134 based on the semantical context 122 are provided with reference to the various implementations described below.

Optionally, one or more sensors 104 are coupled to, or integrated in, the device 102 and are configured to generate the sensor data 106. In some examples, the one or more sensors 104 include one or more microphones configured to capture speech of the user 108, background audio, or both. In some examples, the one or more sensors 104 include one or more cameras configured to capture facial expressions of the user 108, one or more other visual characteristics (e.g., posture, gestures, movement, etc.) of the user 108, or a combination thereof. In some examples, the one or more sensors 104 include one or more motion sensors, such as an inertial measurement unit (IMU) or other sensors configured to detect movement, acceleration, orientation, or a combination thereof. In an illustrative implementation, the one or more processors 116 are integrated in an extended reality ("XR") device that also includes one or more microphones, multiple cameras, and an IMU.

Alternatively, or in addition, the one or more processors 116 can receive at least a portion of the sensor data 106 from recorded sensor data stored at the memory 112, from a second device (not shown) via an optional modem 140, or a combination thereof. For example, the device 102 can correspond to a mobile phone or computer device (e.g., a laptop computer or a server), and the one or more sensors 104 can be coupled to or integrated in an extended reality ("XR") headset, such as a virtual reality ("VR"), augmented reality ("AR"), or mixed reality ("MR") headset device (e.g., an HMD), that is worn by the user 108. In some scenarios, the device 102 receives the sensor data 106 using a wired connection, a wireless connection (e.g., a Bluetooth® (a registered trademark of Bluetooth SIG, Inc., Washington) connection), or both. In some examples, the device 102 can communicate with an XR headset using a low-energy protocol (e.g., a Bluetooth® low energy (BLE) protocol). In some examples, the wireless connection corresponds to transmission and receipt of signals in accordance with an IEEE 802.11-type (e.g., WiFi) wireless local area network or one or more other wireless radiofrequency (RF) communication protocols.

Optionally, the device 102 can include, or be coupled to, a user interface device, such as a display device 150 or other visual user interface device that is configured to display, based on the adjusted face data 134, a representation 152 of the avatar 154 having the avatar facial expression 156. For example, the one or more processors 116 can be configured to generate the representation 152 of the avatar 154 based on the adjusted face data 134 and having an appropriate data format to be transmitted to and displayed at the display device 150. In other implementations, the device 102 can instead (or in addition) send the representation 152 of the avatar 154 to a second device (e.g., a server, or a headset device or computer device of another user) to enable viewing of the avatar 154 by one or more other geographically remote users.

By generating the adjusted face data 134 based on the feature data 124, the resulting avatar facial expression 156 can more accurately or realistically convey expressions or emotions of the user 108 than can be generated from the face data 132 alone, thus improving a user experience.

Figure 2:
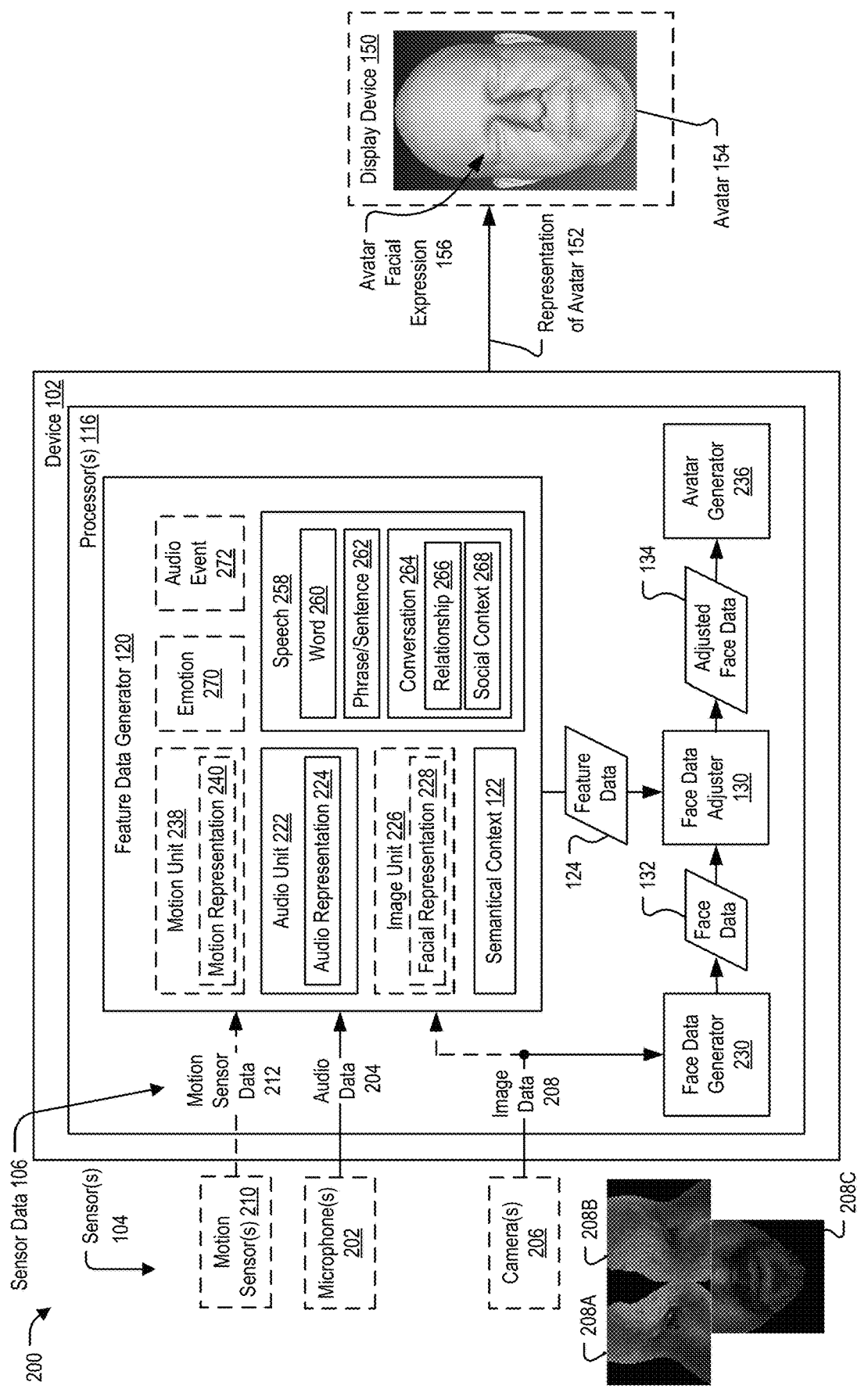
FIG. 2 is a block diagram of another illustrative aspect of a system configured to generate adjusted face data corresponding to an avatar facial expression based on a semantical context, in accordance with some examples of the present disclosure.

FIG. 2 depicts another particular illustrative aspect of a system 200 configured to generate data corresponding to an avatar facial expression. The system 200 includes the device 102 and optionally includes the display device 150, the sensors 104, or both. The sensors 104 optionally include one or more microphones 202, one or more cameras 206, and one or more motion sensors 210. The one or more processors 116 include the feature data generator 120, a face data generator 230, the face data adjuster 130, and an avatar generator 236.

The one or more microphones 202 are configured to generate audio data 204 that is included in the sensor data 106. For example, the one or more microphones 202 can include a microphone (e.g., a directional microphone) configured to capture speech of the user 108, one or more microphones (e.g., one or more directional or omnidirectional microphones) configured to capture environmental sounds in the proximity of the user 108, or a combination thereof. In implementations in which the one or more microphones 202 are omitted, the audio data 204 may be received from another device (e.g., a headset device or other device that includes microphones) via the modem 140 or retrieved from memory (e.g., the memory 112 or another memory, such as network storage), as illustrative examples.

The one or more cameras 206 are configured to generate image data 208 that is included in the sensor data 106. In the illustrated implementation, the image data 208 includes multiple regions of a user's face captured by respective cameras of the one or more cameras 206. The image data 208 includes first image data 208A that includes a representation of a first portion of the user's face, illustrated as a profile view of a region of the user's left eye. The image data 208 includes second image data 208B that includes a representation of a second portion of the user's face, illustrated as a profile view of a region of the user's right eye. The image data 208 includes third image data 208C that includes a representation of a third portion of a user's face, illustrated as a frontal view of a region of the user's mouth.

To illustrate, the one or more cameras 206 can be integrated in a head-mounted device, such as an XR headset or glasses, and various cameras can be positioned at various locations of the XR headset or glasses (e.g., at the user's temples and in front of the user's nose) to enable capture of the image data 208A, 208B, and 208C without substantially protruding from, or impairing an aesthetic appearance of, the XR headset or glasses. However, it should be understood that, in other implementations, the image data 208 may include more than three portions of the user's face or fewer than three portions of the user's face, one or more other portions of the user's face in place of, or in addition to, the illustrated portions, or a combination thereof. In implementations in which the one or more cameras 206 are omitted, the image data 208 may be received from another device (e.g., a headset device or other device that includes cameras) via the modem 140 or retrieved from memory (e.g., the memory 112 or another memory, such as network storage), as illustrative examples.

The one or more processors 116 include a face data generator 230 that is configured to process the image data 208 corresponding to a person's face to generate the face data 132. In an illustrative, non-limiting example, the face data generator 230 includes a three-dimensional morphable model (3DMM) encoder configured to input the image data 208 and generate the face data 132 as a rough mesh representation of the user's face. Although the image data 208 is described as including the face of a user (e.g., the user 108 wearing an XR headset or glasses), in other implementations the image data 208 can include the face of one or more people that are not a "user" of the device 102, such as when the one or more cameras 206 capture faces of multiple people (e.g., the user 108 and one or more other people in the vicinity of the user 108), and the face data 132 is generated based on the face of a "non-user" person in the image data 208.

The face data adjuster 130 is configured to generate the adjusted face data 134 based on the feature data 124 and further based on the face data 132. For example, the face data adjuster 130 can include a deep learning architecture neural network. In an illustrative, non-limiting example, the face data adjuster 130 corresponds to a skin U-Net that includes a convolutional neural network contracting path or encoder followed by a convolutional network expanding path or decoder. The contracting path or encoder can include repeated applications (e.g., layers) of convolution, each followed by a rectified linear unit (ReLU) and a max pooling operation, which reduces spatial information while increasing feature information. The expanding path or decoder can include repeated applications (e.g., layers) of up-convolution and concatenations with high-resolution features from the contracting path, from the feature data 124, or both.

The avatar generator 236 is configured to generate, based on the adjusted face data 134, the representation 152 of the avatar 154 having the avatar facial expression 156. In an illustrative, non-limiting example, the avatar generator 236 includes a U-Net implementation, such as an NRA U-Net.

The feature data generator 120 includes an audio unit 222 configured to process the audio data 204 and to generate an audio representation 224 based on the audio data 204 and that may indicate, or be used to determine, the semantical context 122. Although not illustrated, in some implementations the feature data generator 120 is configured to perform preprocessing of the audio data 204 into a format more useful for processing at the audio unit 222. In some implementations, the audio unit 222 includes a deep learning neural network, such as an audio variational autoencoder (VAE), that is trained to identify characteristics of speech in the audio data 204, and the audio representation 224 includes one or more of an expression condition, an audio phoneme, or a Mel spectrogram, as illustrative, non-limiting examples. Alternatively, or in addition, the audio unit 222 is configured to determine one or more signal processing speech representations, such as Mel frequency cepstral coefficients (MFCC), MFCC and pitch information, spectrogram information, or a combination thereof, as described further with reference to FIG. 4. Alternatively, or in addition, the audio unit 222 is configured to determine one or more speech representations or labels based on automatic speech recognition (ASR), such as described further with reference to FIG. 5. Alternatively, or in addition, the audio unit 222 is configured to determine one or more deep-learned speech representations from self-supervised learning, such as based on a Wav2vec, VQ-Wav2vec, Wav2vec2.0, or Hubert implementation, as illustrative, non-limiting examples, such as described further with reference to FIG. 6.

In an illustrative example, the semantical context 122 is based on a meaning of speech 258 represented in the audio data 204 (e.g., the emotional content associated with the user's speech 258). In some examples, the semantical context 122 is based on a meaning of a word 260 detected in the speech 258. In some examples, the semantical context 122 is based on a meaning of at least one phrase or sentence 262 detected in the speech 258. To illustrate, the audio unit 222 can include a dictionary or other data structure or model that maps words, phrases, sentences, or a combination thereof, to meanings associated with the words, phrases, or sentences. As used herein, a "meaning" associated with a word, phrase, or sentence can include an emotion associated with the word, phrase, or sentence. To illustrate, the audio unit 222 may scan the audio data 204 for specific key words or phrases that convey a particular context or emotion, such as "budget," "bandwidth," "action item," and "schedule," associated with business language, "great," "terrific," and "can't wait to see you," associated with happiness, and "oh no," "sorry," "that's too bad" associated with sadness, as illustrative, non-limiting examples.

In some examples, the speech 258 includes at least a portion of a conversation 264, and the semantical context 122 is based on a characteristic of the conversation 264. To illustrate, in some implementations, the characteristic includes a type of relationship 266 (e.g., familial, intimate, professional, formal, casual, etc.) between the user 108 and another participant engaged in the conversation 264. In some implementations, the characteristic of the conversation 264 includes a social context 268 (e.g., at work, at home, shopping, traveling, etc.) of the conversation 264. The relationship 266 and the social context 268 may be useful in determining the type of contact (e.g., people involved in the conversation). According to an aspect, knowing the type of contact can help the feature data generator 120 to predict the type of conversation that might occur, which can impact the types of facial expressions the user's avatar 154 might make. In some examples, the type of contact is determined based on a contact list in the device 102. "Business" types of contacts can include a co-worker, client/customer, or vendor; "friend" types of contacts can include platonic, romantic, elderly, or child; and "family" types of contact can include elderly, adult, child, spouse, wife, and husband, as illustrative, non-limiting examples. In some implementations, the one or more processors 116 are configured to build a history of the user's interactions with various contacts, create a model for each contact, and predict the types of interaction that might occur in future interactions. The resulting facial expressions of the avatar 154 are thus likely to be different for the various contacts.

Optionally, the semantical context 122 is based on an emotion 270 associated with the speech 258 represented in the audio data 204. In an illustrative example, the one or more processors 116 are configured to process the audio data 204 to predict the emotion 270. For example, in addition to detecting emotion associated with the meanings of words, phrases, and sentences of the user's speech 258, the audio unit 222 can include one or more machine learning models that are configured to detect audible emotions, such as happy, sad, angry, playful, romantic, serious, frustrated, etc., based on the speaking characteristics of the user 108 (e.g., based on tone, pitch, cadence, volume, etc.). The feature data generator 120 may be configured to associate particular facial expressions or characteristics with various audible emotions. In some implementations, the adjusted face data 134 causes the avatar facial expression 156 to represent the emotion 270 (e.g., smiling to express happiness, eyes narrowed to express anger, eyes widened to express surprise, etc.).

In some examples, the semantical context 122 is based on an audio event 272 detected in the audio data 204. For example, the audio unit 222 can include an audio event detector that may access a database (not shown) that includes models for different audio events, such as a car horn, a dog barking, an alarm, etc. In a particular aspect, an "audio event" can correspond to a particular audio signature or set of sound characteristics that may be indicative of an event of interest. In some implementations, audio events exclude speech, and therefore detecting an audio event is distinct from keyword detection or speech recognition. In some implementations, detection of an audio event can include detection of particular types of vocal sounds (e.g., a shout, a scream, a baby crying, etc.) without including keyword detection or determination the content of the vocal sounds. In response to sound characteristics in the audio data 204 matching (or substantially matching) a particular model, the audio event detector can generate audio event information indicating that the audio data 204 represents the audio event 272 associated with the particular model. As used herein, sound characteristics in the audio data 204 may "match" a particular sound model if the pitch and frequency components of the audio data 204 are within threshold values of pitch and frequency components of the particular sound model. In some implementations, the audio unit 222 includes one or more classifiers configured to process the audio data 204 to determine an associated class from among multiple classes supported by the one or more classifiers. In an example, the one or more classifiers operate in conjunction with the audio event models described above to determine a class (e.g., a category, such as "dog barking," "glass breaking," "baby crying," etc.) for a sound represented in the audio data 204 and associated with an audio event 272. For example, the one or more classifiers can include a neural network that has been trained using labeled sound data to distinguish between sounds corresponding to the various classes and that is configured to process the audio data 204 to determine a particular class for a sound represented by the audio data 204 (or to determine, for each class, a probability that the sound belongs to that class).

The semantical context 122 associated with detected audio events can correspond to an emotion associated with the audio events, such as fear or surprise for "glass breaking," compassion or frustration for "baby crying," etc. In other examples, the semantical context 122 associated with detected audio events can correspond to other aspects, such as a location or environment of the user 108 (e.g., on a busy street, in an office, at a restaurant) that may be determined based on detecting the audio event 272.

Optionally, the sensor data 106 includes image data 208, and the feature data generator 120 includes an image unit 226 that is configured to generate a facial representation 228 based on the image data 208 and that may indicate, or be used to determine, the semantical context 122. Although not illustrated, in some implementations the feature data generator 120 is configured to perform preprocessing of the image data 208 into a format more useful for processing at the image unit 226. The image unit 226 can include one or more neural networks (e.g., facial part VAEs) that are configured to process the image data 208 specifically to detect facial expressions and movements in the image data 208 with greater accuracy than the face data generator 230. For example, since the face data generator 230 may be unable to generate a sufficiently accurate representation of the user's facial expressions to be perceived as realistic, by also processing the image data 208 using neural networks of the image unit 226 that are trained to specifically detect facial expressions and movements associated with speaking, conveying emotion, etc., such as in the vicinity of the eyes and mouth, and using such detected facial expressions and movements when generating the feature data 124, the resulting adjusted face data 134 can provide a more accurate and realistic facial expression of the avatar 154. In a particular implementation, the facial representation 228 includes an indication of one or more expressions, movements, or other features of the user 108. The image unit 226 may detect facial expressions and movements in the image data 208, such as a smile, wink, grimace, etc., while the user 108 is not speaking and that would not otherwise be detectable by the audio unit 222, further enhancing the accuracy and realism of the avatar 154.

In some examples, the semantical context 122 is based on the emotion 270, and the emotion 270 is associated with an expression on the user's face represented in the image data 208 instead of, or in addition to, being based on audible emotion detected in the user's voice or emotional content associated with the user's speech 258. In some implementations, the audio data 204 and the image data 208 are input to a neural network that is configured to detect the emotion 270, such as described further with reference to FIG. 7.

Optionally, the sensor data 106 includes motion sensor data 212, and the semantical context 122 is based on the motion sensor data 212. In some examples, the motion sensor data 212 is received from one or more motions sensors 210 that are coupled to or integrated in the device 102. To illustrate, the one or more sensors 104 optionally include the one or more motion sensors 210, such as one or more accelerometers, gyroscopes, magnetometers, an inertial measurement unit (IMU), one or more cameras configured to detect user movement, one or more other sensors configured to detect movement, acceleration, orientation, or a combination thereof. For example, the motion sensor data 212 can include head-tracker data associated with movement of the user 108, such as described further with reference to FIG. 22.

The feature data generator 120 may include a motion unit 238 configured to process the motion sensor data 212 and to determine a motion representation 240 based on the motion sensor data 212 and that may indicate, or be used to determine, the semantical context 122. Although not illustrated, in some implementations the feature data generator 120 is configured to perform preprocessing of the motion sensor data 212 into a format more useful for processing at the motion unit 238. The motion unit 238 can be configured to identify head movements that indicate meanings or emotions, such as nodding (indicating agreement) or shaking of the head (indicating disagreement), an abrupt jerking of the head indicating surprise, etc. In another example, the motion sensor data 212 at least partially corresponds to movement of a vehicle (e.g., an automobile) that the user 108 is operating or travelling in, and the motion unit 238 may be configured to identify vehicle movements that may provide contextual information. For example, the motion sensor data 212 indicating an abrupt lateral motion or rotational motion (e.g., resulting from a collision) or an abrupt deceleration (e.g., indicating a panic stop) may be associated with fear or surprise, while a relatively quick acceleration may be associated with excitement.

Thus, the system 200 enables audio-based, and optionally camera-based and motion-based, techniques to increase the realism of the avatar 154. In addition, the system 200 enables use of predictive methods to decrease the latency associated with displaying the facial characteristics of the avatar 154, and the decreased latency also increases the perceived realism of the avatar 154.

In some implementations, the system 200 uses the one or more microphones 202 to capture/record the user's auditory behaviors to recognize sounds generated by the user and identify emotions. The recognized auditory information can inform the system 200 as to the current behavior, emotion, or both, that the user's face is demonstrating, and the user's face also has facial expressions associated with the behavior or emotion. For example, if the user is laughing, then the system 200 can exclude certain facial expressions that are not associated with laughter and can therefore select from a smaller set of specific facial expressions when determining the avatar facial expression 156. Reducing the number of probable emotion types being exhibited by the user 108 is advantageous because the system 200 can apply the curated audio information to increase the accuracy of the facial expressions of the avatar 154. For example, the system 200 may identify a laugh in the audio data 204, and in response to identifying the laugh, the system 200 can adjust the avatar facial expression 156 to make the mouth smile bigger, make the eyes tighten, enhance crow's feet around eyes, show dimples, etc.

Machine learning models associated with audible cues and emotion can be included in the system 200 (e.g., in the audio unit 222) to translate the audio information into an accurate understanding of the user's emotions. Translating of the user's auditory behavior (e.g., laughter) to associated emotions results in targeted (e.g., higher probability) information for the system 200 to utilize to add accuracy to the avatar facial expression 156. For example, the audio unit 222 may create and extract audio codes related to specific emotions (e.g., the audio representation 224) and relate the audio codes to the facial codes and expressions (e.g., in the facial representation 228 and the feature data 124).

In some implementations, the device 102 may use the audio data 204 to enhance the quality of the avatar's expressions without using any image data 208. To illustrate, the device 102 may identify the various users participating in an interaction, and previously enrolled avatars for the users using images or videos may be used as a baseline. However, the facial expressions for each of the avatars may be based on audio input from the users as described above. In some implementations, the device 102 may intermittently use the one or more cameras 206 to augment the audio data 204 to assist in creating the expressions of the avatars. Both of the above-described implementations enable reduction in camera usage, which results in power savings due to the one or more cameras 206 being used less, turned off, or omitted from the system 200 entirely.

According to an aspect, the processing of the audio data at the audio unit 222 enables the device 102 to determine a magnitude (from low to high, amplify or reduce) of the expression to be portrayed by the avatar 154. Context and volume of the voice, the emotional response, or both, exhibited in the audio data 204 are examples of information that can be used to determine the magnitude of the expression portrayed by the avatar 154. For example, a loud laugh of the user 108 can result in the avatar 154 displaying a large, open mouth, and other facial aspects related to a boisterous laugh may also be increased.

Using the auditory information from the interaction between avatars (users) in a given interaction can enable improved prediction, anticipation, or both, of the users' facial expressions and increase the accuracy of the facial expressions of the avatars. The device 102 may "listen" to the conversations (e.g., to detect key words, determine meanings of sentences, etc.) and behavioral interactions (e.g., tone of voice, emotional reactions, etc.) for one or more avatars or users to create a model for the context of such conversations. In some implementations, the device 102 can determine the semantical context 122 of a conversation and predict a future emotion, based on the model and the semantical context 122, that might be exhibited by one or more of the participants of the conversation.

According to some aspects, the feature data generator 120 is configured to alter one or more behaviors or characteristics of the avatar 154 to fit certain social situations. For example, the feature data generator 120 may determine to alter such behaviors or characteristics based on analysis of the conversation 264 (e.g., based on the relationship 266, the social context 268, or both), based on a user preference (e.g., according to a preference setting in a user profile), or both. In some implementations, the feature data generator 120 includes one or more models or information that limits a range of expressions or emotions that can be expressed by the avatar 154 based on the semantical context 122 and characteristics of the conversation 264. For example, the feature data generator 120 may adjust the feature data 124 to prevent the avatar 154 from displaying one or more emotional and expressive extremes that the user 108 may exhibit during a conversation with a co-worker of the user in a professional context, such as by preventing the avatar 154 from expressing some emotions such as anger or love, and limiting a magnitude of other emotions such as boredom, excitement, or frustration. However, during a conversation with the same co-worker in a casual context, the feature data generator 120 may allow the avatar to exhibit a larger range of emotions and facial expressions.

In some implementations, the user 108 may select a "personality setting" that indicates the user's preference for the behavior of the avatar 154 for a particular social situation, such as to ensure that the avatar 154 is socially appropriate, or in some way "better" than the user 108 for the particular social situation (e.g., so that the avatar 154 appears "cool," "brooding," "excited," or "interested," etc.). For example, the user 108 may set parameters (e.g., choose a personality profile for the avatar 154 via a user interface of the device 102) before an interaction with others, and the device 102 alters the avatar's behaviors in accordance with the parameters. Thus, the avatar 154 might not accurately match the behavior of the user 108 but may instead exhibit an "appropriate" behavior for the context. For example, the device 102 may prevent the avatar 154 from expressing behaviors indicating that the user 108 is inattentive during an interaction, such as when the user 108 check the user's phone (e.g., head tilts downward, eye focus lowers, facial expression suddenly changes, etc.). The feature data generator 120 may adjust the feature data 124 to cause the avatar 154 to express subtle visual facial cues to make the communication more comfortable, to exhibit courteous behaviors, etc., that are not actually expressed by the user 108.

FIG. 3 illustrates an example of components 300 that can be implemented in a system configured to generate adjusted face data corresponding to an avatar facial expression, such as in the device 102. The components 300 include an audio network 310, the image unit 226, and the face data adjuster 130.

The audio network 310 corresponds to a deep learning neural network, such as an audio variational autoencoder, that can be implemented in the feature data generator 120. The audio network 310 is trained to identify characteristics of speech in the audio data 204 and to determine an audio representation 324 that includes one or more of an expression condition, an audio phoneme, or a Mel spectrogram, as illustrative, non-limiting examples. In an illustrative example, the audio network 310 corresponds to, or is included in, the audio unit 222, and the audio representation 324 corresponds to, or is included in, the audio representation 224 of FIG. 2.

The audio network 310 outputs one or more audio-based features 320 that are included in the feature data 124. In some examples, the one or more audio-based features 320 correspond to the audio representation 324, such as by including the audio representation 324 or an encoded version of the audio representation 324. Alternatively, or in addition, the one or more audio-based features 320 can include one or more expression characteristics that associated with the audio representation 324. For example, the audio network 310 may map particular values of the audio representation 324 to one or more emotions or expressions. To illustrate, the audio network 310 may be trained to identify a particular value, or set of values, in the audio representation 324 as corresponding to laughter, and the audio network 310 may include an indication of one or more facial expressions associated with laughter, indication of laughter itself (e.g. a code that represents laughter), or a combination thereof, in the audio-based features 320.

Similarly, the image unit 226 outputs one or more image-based features 322 that included in the feature data 124. In some examples, the one or more image-based features 322 correspond to the facial representation 228, such as by including the facial representation 228 or an encoded version of the facial representation 228. Alternatively, or in addition, the one or more image-based features 322 can include one or more expression characteristics that are associated with the facial representation 228. For example, the image unit 226 may map particular values of the facial representation 228 to one or more emotions or expressions. To illustrate, the image unit 226 may include a network that is trained to identify a particular value, or set of values, in the facial representation 228 as corresponding to laughter, and the image unit 226 may include an indication of one or more facial expressions associated with laughter, indication of laughter itself (e.g. a code that represents laughter), or a combination thereof, in the image-based features 322.

The one or more audio-based features 320 and the one or more image-based features 322 are combined (e.g., concatenated, fused, etc.) in the feature data 124 to be used by the face data adjuster 130 in generating the adjusted face data 134, such as described further with reference to FIGS. 16-21.

FIG. 4 illustrates an example of components 400 that can be implemented in a system configured to generate adjusted face data corresponding to an avatar facial expression, such as in the device 102. The components 400 include a speech signal processing unit 410, the image unit 226, and the face data adjuster 130. In a particular implementation, the image unit 226 and the face data adjuster 130 operate substantially as described above.

The speech signal processing unit 410 includes one or more components configured to process the audio data 204 and to detect, generate, or otherwise determine characteristics of speech in the audio data 204 and to determine an audio representation 424. The audio representation 424 includes one or more signal processing speech representations such as Mel frequency cepstral coefficients (MFCCs), MFCC and pitch information, or spectrogram information (e.g., a regular spectrogram, a log-Mel spectrogram, or one or more other types of spectrogram), as illustrative, non-limiting examples. In an illustrative example, the speech signal processing unit 410 corresponds to, or is included in, the audio unit 222, and the audio representation 424 corresponds to, or is included in, the audio representation 224 of FIG. 2.

The speech signal processing unit 410 outputs one or more audio-based features 420 that are included in the feature data 124. In some examples, the one or more audio-based features 420 correspond to the audio representation 424, such as by including the audio representation 424 or an encoded version of the audio representation 424. Alternatively, or in addition, the one or more audio-based features 420 can include one or more expression characteristics that are associated with the audio representation 424. For example, the speech signal processing unit 410, the audio unit 222, or both, may map particular values of the audio representation 424 to one or more emotions or expressions. To illustrate, the speech signal processing unit 410 may include one or more components (e.g., one or more lookup tables, one or more trained networks, etc.) that are configured identify a particular value, or set of values, in the audio representation 424 as corresponding to laughter, and the speech signal processing unit 410 may include an indication of one or more facial expressions associated with laughter, indication of laughter itself (e.g. a code that represents laughter), or a combination thereof, in the audio-based features 420.

The one or more audio-based features 420 and the one or more image-based features 322 from the image unit 226 are combined (e.g., concatenated, fused, etc.) in the feature data 124 to be used by the face data adjuster 130 in generating the adjusted face data 134, such as described further with reference to FIGS. 16-21.

An example implementation 450 depicts components that can be included in the speech signal processing unit 410 to perform the speech signal processing. A pre-emphasis filter 454 is configured to perform pre-emphasis filtering of a speech signal 452 included in the audio data 204. A window block 456 performs a windowing operation on the output of the pre-emphasis filter 454, and a transform block 458 performs a transform operation (e.g., a fast Fourier transform (FFT)) on each of the windows. The resulting transformed data is processed at a Mel filter bank 460 and a logarithm block 462. A transform block 464 (e.g., a discrete cosine transform (DCT) or inverse-FFT (IFFT)) performs an inverse transform on the output of the logarithm block 462, and the resulting time-domain data is processed at a Mel cepstrum block 466 to generate MFCCs 480. A spectrogram 482 (e.g., a Mel-log spectrogram) may be generated based on the frequency-domain output of the logarithm block 462. A pitch 484 can be determined based on an autocorrelation block 470 that determines autocorrelations (R) for multiple offset periods of the time-domain output of the window block 456, and a "find max R" block 472 to determine the offset period associated with the largest autocorrelation.

Figure 5:
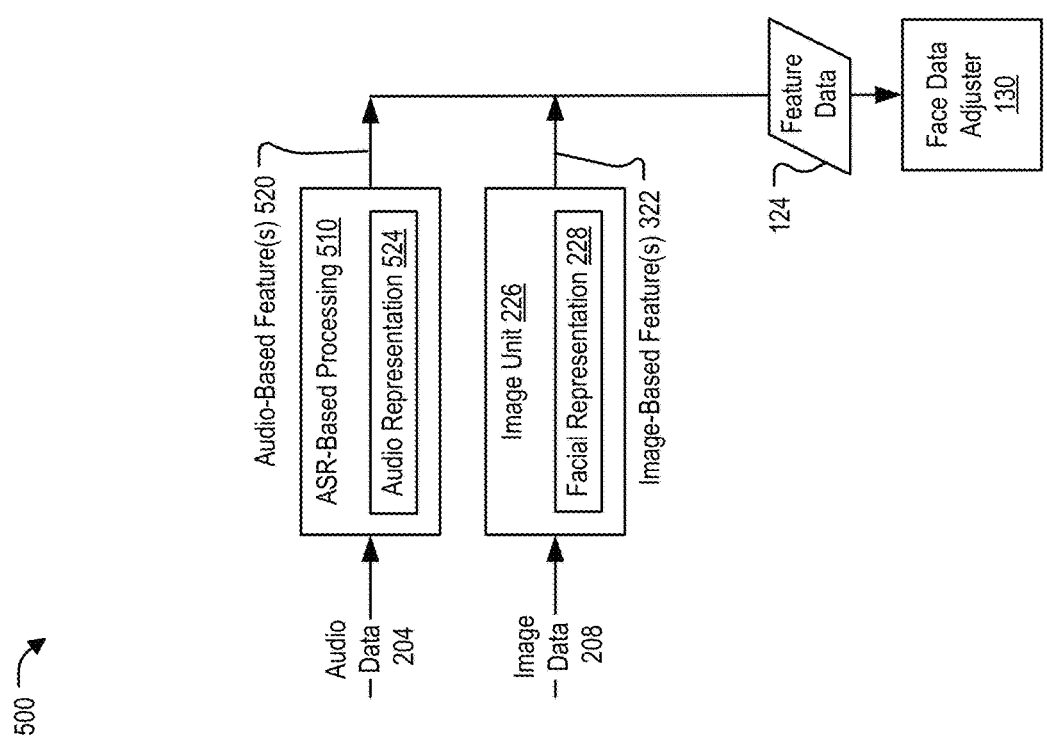
FIG. 5 is a block diagram of another illustrative aspect of components that can be included in a system configured to generate adjusted face data corresponding to an avatar facial expression based on audio data, in accordance with some examples of the present disclosure.

FIG. 5 illustrates another example of components 500 that can be implemented in a system configured to generate adjusted face data corresponding to an avatar facial expression, such as in the device 102. The components 500 include an automatic speech recognition (ASR)-based processing unit 510, the image unit 226, and the face data adjuster 130. In a particular implementation, the image unit 226 and the face data adjuster 130 operate substantially as described above.

The ASR-based processing unit 510 includes one or more components configured to process the audio data 204 and to detect, generate, or otherwise determine characteristics of speech in the audio data 204 and to determine an audio representation 524. The audio representation 524 includes one or more speech representations or labels based on automatic speech recognition (ASR), such as one or more phonemes, diphones, or triphones, associated stress or prosody (e.g., durations, pitch), one or more words, or a combination thereof, as illustrative, non-limiting examples. In an illustrative example, the ASR-based processing unit 510 corresponds to, or is included in, the audio unit 222, and the audio representation 524 corresponds to, or is included in, the audio representation 224 of FIG. 2.

The ASR-based processing unit 510 outputs one or more audio-based features 520 that are included in the feature data 124. In some examples, the one or more audio-based features 520 include the audio representation 524 or an encoded version of the audio representation 524, one or more expression characteristics that are associated with the audio representation 524, or a combination thereof, in a similar manner as described for the speech signal processing unit 410 of FIG. 4.

Figure 6:
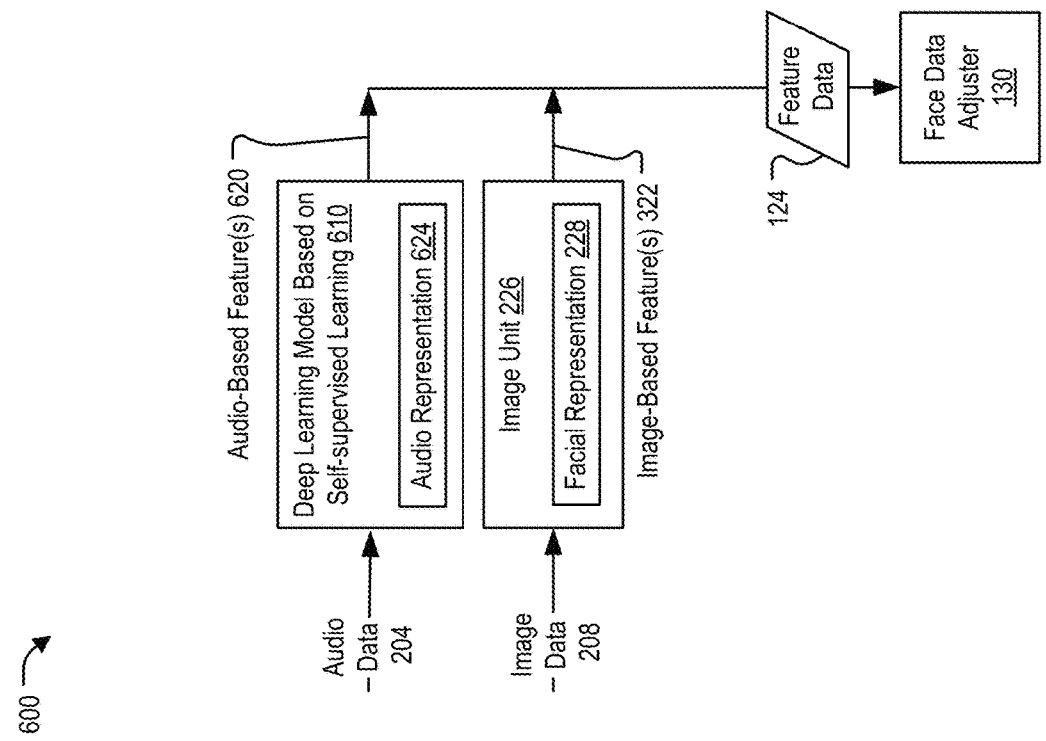
FIG. 6 is a block diagram of another illustrative aspect of components that can be included in a system configured to generate adjusted face data corresponding to an avatar facial expression based on audio data, in accordance with some examples of the present disclosure.

FIG. 6 illustrates another example of components 600 that can be implemented in a system configured to generate adjusted face data corresponding to an avatar facial expression, such as in the device 102. The components 600 include a deep learning model 610 that is based on self-supervised learning, the image unit 226, and the face data adjuster 130. In a particular implementation, the image unit 226 and the face data adjuster 130 operate substantially as described above.

The deep learning model 610 is configured to determine an audio representation 624. The audio representation 624 includes one or more deep-learned speech representations from self-supervised learning, such as based on a Wav2vec, VQ-Wav2vec, Wav2vec2.0, or Hubert implementation, as illustrative, non-limiting examples. In an illustrative example, the deep learning model 610 corresponds to, or is included in, the audio unit 222, and the audio representation 624 corresponds to, or is included in, the audio representation 224 of FIG. 2.

The deep learning model 610 outputs one or more audio-based features 620 that are included in the feature data 124.

In some examples, the one or more audio-based features 620 include the audio representation 624 or an encoded version of the audio representation 624, one or more expression characteristics that are associated with the audio representation 624, or a combination thereof, in a similar manner as described for the speech signal processing unit 410 of FIG. 4.

Figure 7:
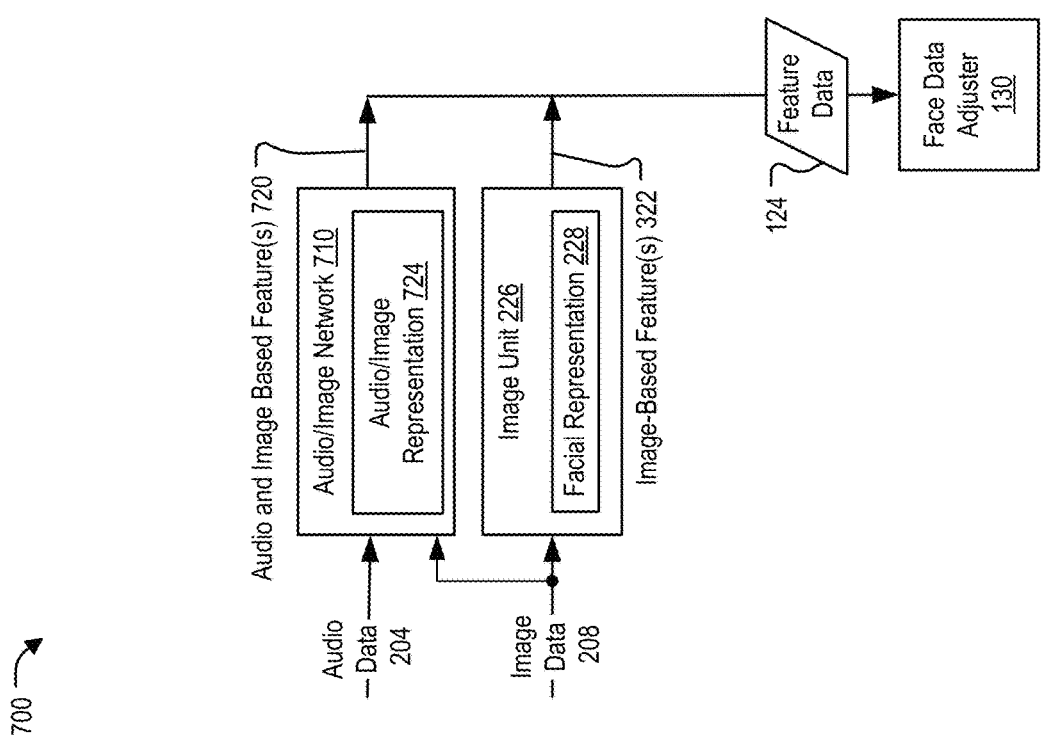
FIG. 7 is a block diagram of a particular illustrative aspect of components that can be included in a system configured to generate adjusted face data corresponding to an avatar facial expression based on audio data and image data, in accordance with some examples of the present disclosure.

FIG. 7 illustrates another example of components 700 that can be implemented in a system configured to generate adjusted face data corresponding to an avatar facial expression, such as in the device 102. The components 700 include an audio/image network 710, the image unit 226, and the face data adjuster 130. In a particular implementation, the image unit 226 and the face data adjuster 130 operate substantially as described above.

The audio/image network 710 is configured to determine an audio/image representation 724. In an illustrative example, the audio/image representation 724 includes a deep learning architecture neural network that receives the audio data 204 and the image data 208 as inputs and that is configured to determine the audio/image representation 724 as a result of jointly processing the audio data 204 and the image data 208. In an illustrative example, the audio/image network 710 is included in the feature data generator 120 and may correspond to, be included in the audio unit 222, and the audio/image representation 724 corresponds to, or is included in, the audio representation 224 of FIG. 2. In another illustrative example, the feature data generator 120 includes the audio/image network 710 instead of, or in addition to, the audio unit 222.

The audio/image network 710 outputs one or more audio and image based features 720 that are included in the feature data 124. In some examples, the one or more audio and image based features 720 include the audio/image representation 724 or an encoded version of audio/image representation 724, one or more expression characteristics that are associated with the audio/image representation 724, or a combination thereof, in a similar manner as described for the speech signal processing unit 410 of FIG. 4.

The audio/image network 710 enables a system to listen to a user's voice and analyze the user's image to interpret emotions and behaviors. In some implementations, the audio/image network 710 is configured to detect emotion (e.g., the emotion 270 of FIG. 2) based on the audio data 204, the image data 208, or both. By using the both the audio data 204 and the image data 208, emotions can be detected based on visual cues (e.g., a facial expression) that are not present in the audio data 204 and also based on audible cues (e.g., a vocal tone) that are not present in the image data 208, enabling more accurate detection as compared to performing detection using the audio data 204 only or the image data 208 only. The audio/image network 710 also enables more robust detection under low signal-to-noise audio conditions that may reduce detection based on the audio data 204 as well as under poor lighting or image capture conditions that may impede detection based on the image data 208.

According to some aspects, joint processing of the audio data 204 and the image data 208 can also enable higher accuracy of disambiguating emotions that may have similar audible or visual cues. As a simplified, non-limiting example, emotion "A" (e.g., melancholy) may be associated with similar audible cues as emotion "B" (e.g., sadness) and may be associated with similar visual cues as emotion "C" (e.g., joy). Speech analysis alone may mis-predict a user's emotion A as emotion B, visual analysis alone may mis-predict the user's emotion A as emotion C, but a combined speech and visual analysis performed by the audio/image network 710 may correctly predict emotion A.

Figure 8:
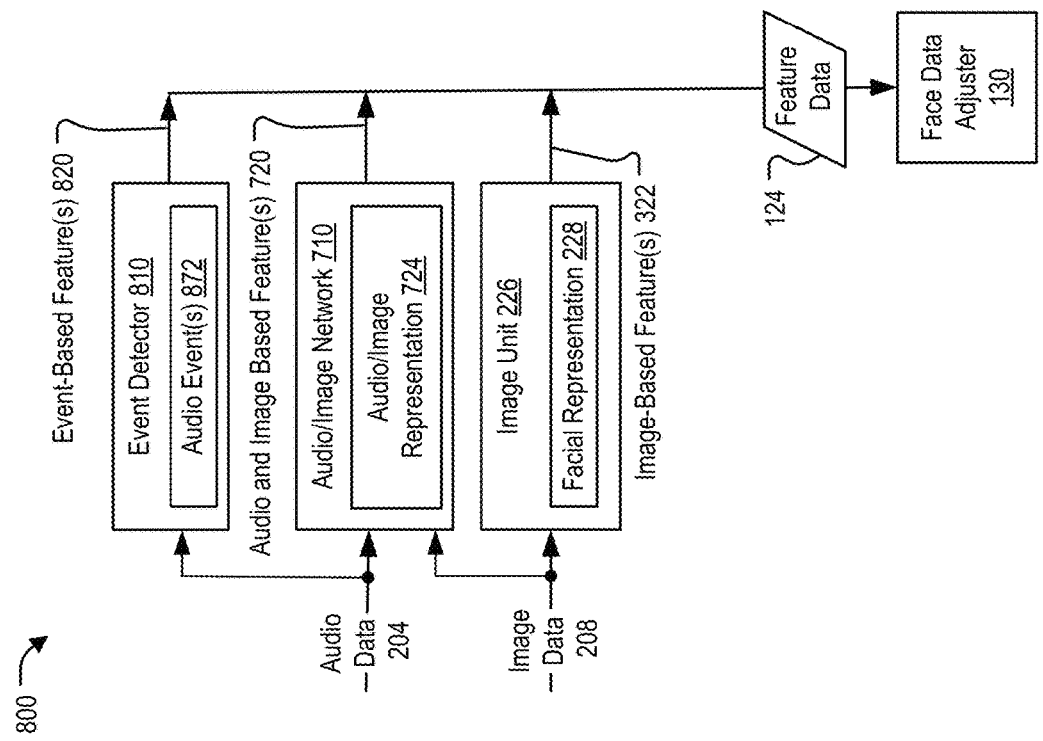
FIG. 8 is a block diagram of another illustrative aspect of components that can be included in a system configured to generate adjusted face data corresponding to an avatar facial expression based on audio data and image data, in accordance with some examples of the present disclosure.

FIG. 8 illustrates another example of components 800 that can be implemented in a system configured to generate adjusted face data corresponding to an avatar facial expression, such as in the device 102. The components 800 include an event detector 810, the audio/image network 710, the image unit 226, and the face data adjuster 130. In a particular implementation, the audio/image network 710, the image unit 226 and the face data adjuster 130 operate substantially as described above.

The event detector 810 is configured to process the audio data 204 to detect one or more audio events 872. In an illustrative example, the event detector 810 is included in the audio unit 222 and the one or more audio events 872 correspond to the audio event 272 of FIG. 2. In some implementations, the event detector 810 is configured to compare sound characteristics of the audio data 204 to audio event models to identify the one or more audio events 872 based on matching (or substantially matching) one or more particular audio event models. In some implementations, the event detector 810 includes one or more classifiers configured to process the audio data 204 to determine an associated class from among multiple classes supported by the one or more classifiers. In an example, the one or more classifiers operate in conjunction with the audio event models described above to determine a class (e.g., a category, such as "dog barking," "glass breaking," "baby crying," etc.) for a sound represented in the audio data 204 and associated with an audio event 872. For example, the one or more classifiers can include a neural network that has been trained using labeled sound data to distinguish between sounds corresponding to the various classes and that is configured to process the audio data 204 to determine a particular class for a sound represented by the audio data 204 (or to determine, for each class, a probability that the sound belongs to that class).

The event detector 810 is configured to inform the semantical context 122 based on detected audio events, which can correspond to an associated emotion such as fear or surprise for "glass breaking," compassion or frustration for "baby crying," etc. In other examples, the semantical context 122 associated with detected audio events can correspond to other aspects, such as a location or environment of the user 108 (e.g., on a busy street, in an office, at a restaurant) that may be determined based on detecting the audio event 272.

The event detector 810 outputs one or more event-based features 820 that are included in the feature data 124. In some examples, the one or more event-based features 820 include labels or other identifiers of the one or more audio event 872, one or more expression characteristics or emotion associated with the one or more audio events 872, such as fear or surprise for "glass breaking," compassion for "baby crying," etc. Including the one or more event-based features 820 in the feature data 124 enables the face data adjuster 130 to more accurately predict a facial expression of the avatar 154, to anticipate a future facial expression of the avatar 154, or a combination thereof.

Figures 9, 10:
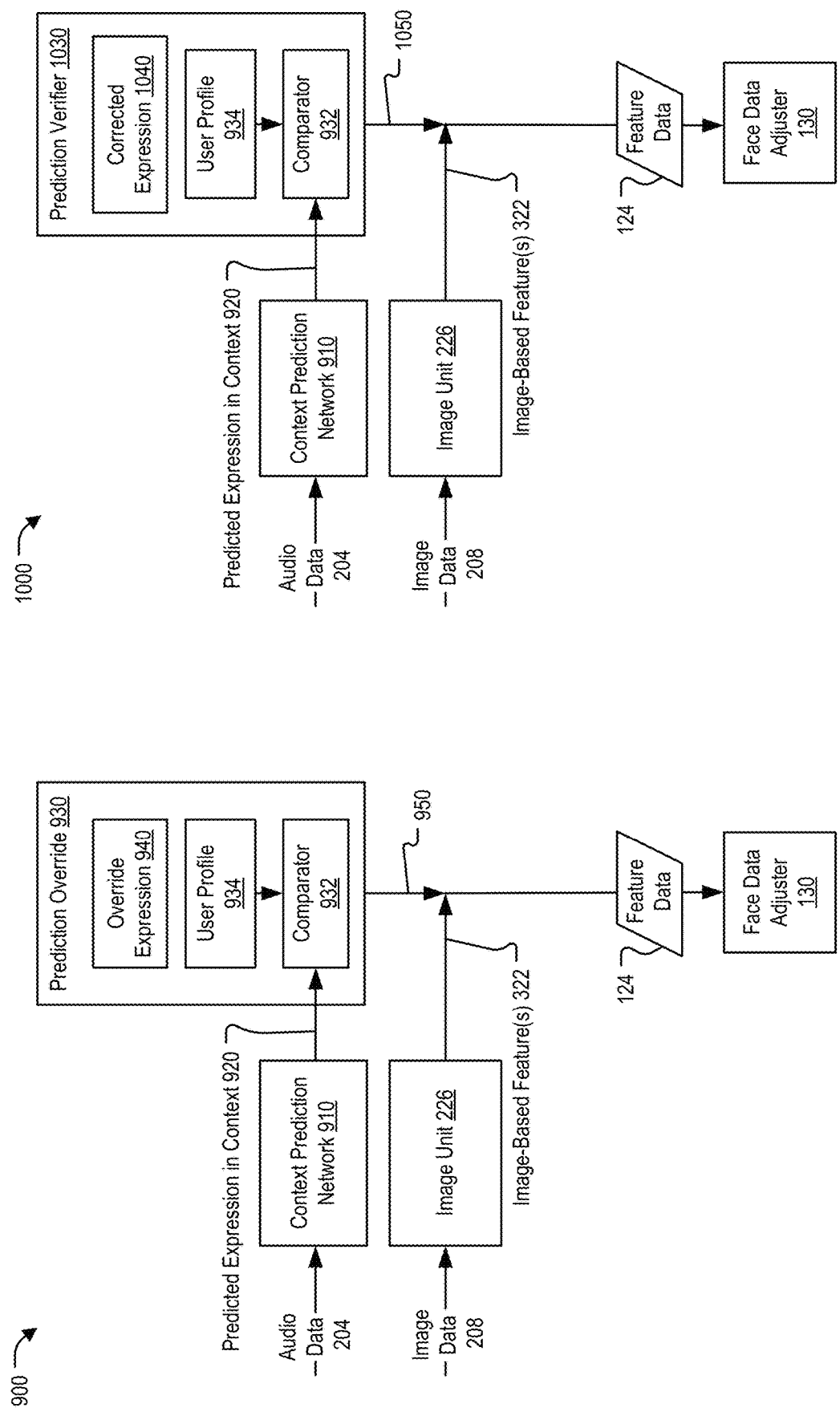
FIG. 9 is a block diagram of a particular illustrative aspect of components that can be included in a system configured to generate adjusted face data corresponding to an avatar facial expression in conjunction with a user profile, in accordance with some examples of the present disclosure.
FIG. 10 is a block diagram of another illustrative aspect of components that can be included in a system configured to generate adjusted face data corresponding to an avatar facial expression in conjunction with a user profile, in accordance with some examples of the present disclosure.

FIG. 9 illustrates another example of components 900 that can be implemented in a system configured to generate adjusted face data corresponding to an avatar facial expression, such as in the device 102. The components 900 include a context prediction network 910, a prediction override unit 930, the image unit 226, and the face data adjuster 130. In a particular implementation, the image unit 226 and the face data adjuster 130 operate substantially as described above. In a particular implementation, the context prediction network 910 and the prediction override unit 930, or both, are included in the feature data generator 120, such as in the audio unit 222.

According to an aspect, the context prediction network 910 is configured to process at least a portion of a conversation represented in the audio data 204 and to use the context and tone of the conversation to anticipate the emotion and which facial expressions might occur, such as described with reference to the conversation 264 of FIG. 2. In some implementations, the audio data 204 processed by the context prediction network 910 includes a single user's portion of the conversation (e.g., the speech of the user 108 detected via the one or more microphones 202). In other implementations, the audio data 204 processed by the context prediction network 910 also includes speech from one or more (or all) avatars and participants engaging in the conversation. The context prediction network 910 is configured to output a predicted expression in context 920 (e.g., an encoding or indication of a predicted facial expression, emotion, or behavior) one or more features associated with the predicted expression, or a combination thereof, for the avatar 154. In a particular implementation, the context prediction network 910 includes a long short term memory (LSTM) network configured to process the conversation and output the predicted expression in context 920.

According to an aspect, the prediction override unit 930 includes a comparator 932 configured to compare the predicted expression in context 920 to a user profile 934. The user profile 934 may enumerate or indicate a range of permissible behaviors or characteristics for the avatar 154, or may enumerate or indicate a range of prohibited behaviors or characteristics for the avatar 154, as non-limiting examples. In some implementations, the user profile 934 includes multiple sets of parameters that correspond to different types of conversations, such as different sets of permissible behaviors or characteristics for business conversation, conversations with family, and conversations with friends. The prediction override unit 930 may be configured to select a particular set of parameters based on the relationship 266, the social context 268, or both, of FIG. 2, and the comparator 932 may be configured to perform a comparison to determine whether the predicted expression in context 920 complies with the selected set of parameters. In some implementations, user profile 934 may include one or more "personality settings" selected by the user 108 that indicate the user's preference for the behavior of the avatar 154 for one or more types of social situations or contexts, such as described previously with reference to FIG. 2.

According to an aspect, in response to determining that the predicted expression in context 920 "matches" (e.g., is in compliance with applicable parameters of) the user profile 934, the prediction override unit 930 generates an output 950 that corresponds to the predicted expression in context 920. Otherwise, in response to determining that the predicted expression in context 920 does not match the user profile 934, the prediction override unit 930 selects or generates an override expression 940 to replace the predicted expression in context 920 and generates the output 950 that corresponds to the override expression 940. To illustrate, the prediction override unit 930 can select an override expression 940 corresponding to attentiveness to replace a predicted expression in context 920 corresponding to boredom, or can select an override expression 940 corresponding to a neutral or sympathetic expression to replace a predicted expression in context 920 corresponding to anger, as illustrative, non-limiting examples. In other examples, instead of changing a type of expression (e.g., from bored to attentive), the prediction override unit 930 may change a magnitude of the expression. In a nonlimiting, illustrative example in which expressions have accompanying magnitudes from 1 (barely noticeable) to 10 (extreme), the prediction override unit 930 can replace a "magnitude 10 boredom" predicted expression (e.g., extremely bored) with an override expression 940 corresponding to a "magnitude 1 boredom" expression (e.g., only slightly bored).

As a result, the avatar's behaviors/characteristics can be altered to fit certain social situations by analyzing the conversation and context or based on user preferences or settings.

FIG. 10 illustrates another example of components 1000 that can be implemented in a system configured to generate adjusted face data corresponding to an avatar facial expression, such as in the device 102. The components 1000 include the context prediction network 910, a prediction verifier 1030, the image unit 226, and the face data adjuster 130. In a particular implementation, the context prediction network 910, the image unit 226, and the face data adjuster 130 operate substantially as described above. In a particular implementation, the context prediction network 910, the prediction verifier 1030, or both, are included in the feature data generator 120, such as in the audio unit 222.

In contrast to the prediction override unit 930, the prediction verifier 1030 is configured to replace the predicted expression in context 920 with a corrected expression 1040 in response to determining that the predicted expression in context 920 is a mis-prediction. For example, the user profile 934 may include one or more parameters that indicate, based on enrollment data or a user's historical behavior, which expressions are typically expressed by that user in general or in various particular contexts, which expressions are not expressed by the user in general or in particular contexts, or a combination thereof. In response to the predicted expression in context 920 not matching the user profile 934, the prediction verifier 1030 determines that a mis-prediction has occurred and generates an output 1050 corresponding to the corrected expression 1040. The prediction verifier 1030 thus enables the avatar 154 to be generated with improved accuracy by correcting mispredictions of the user's expression.

FIG. 11 illustrates components 1100 that may be implemented in the prediction override unit 930 of FIG. 9 or the prediction verifier 1030 of FIG. 10. The comparator 932 is coupled to receive the predicted expression in context 920 and the user profile 934. In response to determining that the predicted expression in context 920 matches the user profile 934, the comparator 932 provides the predicted expression in context 920 as an output 1150. Otherwise, in response to determining that the predicted expression in context 920 does not match the user profile 934, the comparator 932 provides a code 1130 that corresponds to (e.g., is included in) the predicted expression in context 920 to an expression adjuster 1120.

The expression adjuster 1120 is configured to replace the code 1130 with a replacement code 1132 that corresponds to a corrected expression. For example, the expression adjuster 1120 can include a data structure 1160, such as a table 1162, that enables mapping and lookup operations involving various expressions and their corresponding codes. As illustrated, the code 1130 has a value (e.g., "NNNN") that corresponds to a "happy" expression, and the expression adjuster 1120 replaces the value of the code 1130 with another value (e.g., "YYYY") of a replacement code 1132. The replacement code 1132 corresponds to a replacement expression 1140 (e.g., the override expression 940 or the corrected expression 1040) of "mad," which is provided as the output 1150 (e.g., the output 950 or the output 1050).

Thus, expression override or expression correction can correspond to a type of dictionary comparison. For example, if it is determined by the comparator 932 that an expression prediction is far from what is expected or permitted (e.g., does not "match" the user profile 934), the code of the expression prediction can be replaced by the code of a more appropriate expression (e.g., that does match the user profile 934).

Although FIGS. 9-11 illustrate comparisons to a user profile 934, in other implementations such comparisons may be made to a default set of parameters (e.g., a default profile), such as when individual user profiles are not supported or when an individual profile has not yet been set up by the user.

FIG. 12 illustrates another example of components 1200 that can be implemented in a system configured to generate adjusted face data corresponding to an avatar facial expression, such as in the device 102. The components 1200 include a context-based future speech prediction network 1210, a representation generator 1230, the image unit 226, and the face data adjuster 130. In a particular implementation, the image unit 226 and the face data adjuster 130 operate substantially as described above. In a particular implementation, the context-based future speech prediction network 1210, the representation generator 1230, or both, are included in the feature data generator 120, such as in the audio unit 222.

The context-based future speech prediction network 1210 processes the audio data 204 (and, optionally, also processes the image data 208) to determine a predicted word in context 1220. For example, in some implementations the context-based future speech prediction network 1210 includes a long short-term memory (LSTM)-type neural network that is configured to predict, based on a context of a user's words identified in the audio data 204 (and, in some implementations, further based on the image data 208), the most probable next word, or distribution of words, that will be spoken by the user. Optionally, audio event detection can be used to provide an input to the context-based future speech prediction network 1210, such as described further with reference to FIG. 14.

The representation generator 1230 is configured to generate a representation 1250 of the predicted word in context 1220. In some implementations, the representation generator 1230 is configured to determine one or more phonemes or Mel spectrograms that are associated with the predicted word in context 1220 and to generate the representation 1250 based on the one or more phonemes or Mel spectrograms. The representation 1250 (e.g., the one or more phonemes or Mel spectrograms, or an encoding thereof) may be concatenated to, or otherwise combined with, the one or more image-based features 322 to generate the feature data 124.

The context-based future speech prediction network 1210 and the representation generator 1230 therefore enable prediction, based on a context of spoken words, of what a word or sentence will be, which is used to predict an avatar's facial image/texture or to ensure compliance (e.g., transition between "e" to "1") frame-to-frame, to ensure that the image of the avatar pronouncing words is transitioning correctly over time.

FIG. 13 illustrates another example of components 1300 that can be implemented in a system configured to generate adjusted face data corresponding to an avatar facial expression, such as in the device 102. The components 1300 include a context-based future speech prediction network 1310, a speech representation generator 1330, the image unit 226, and the face data adjuster 130. In a particular implementation, the image unit 226 and the face data adjuster 130 operate substantially as described above. In a particular implementation, the context-based future speech prediction network 1310, the speech representation generator 1330, or both, are included in the feature data generator 120, such as in the audio unit 222.

The context-based future speech prediction network 1310 processes the audio data 204 (and, optionally, also processes the image data 208) to determine predicted speech in context 1320. For example, in some implementations the context-based future speech prediction network 1310 includes a long short-term memory (LSTM)-type neural network that is configured to predict, based on a context of a user's words identified in the audio data 204 (and, in some implementations, further based on the image data 208), the most probable speech, or distribution of speech, that will be spoken by the user.

The speech representation generator 1330 is configured to generate a representation 1350 of the predicted speech in context 1320. In some implementations, the speech representation generator 1330 is configured to determine the representation 1350 as a "classical" representation (e.g., Mel-spectrograms, pitch, MFCCs, as in FIG. 4), one or more labels (e.g., as in FIG. 5), one or more deep-learned representations (e.g., as in FIG. 6), or one or more other representations that are associated with the predicted speech in context 1320. The representation 1350 can be concatenated to, or otherwise combined with, the one or more image-based features 322 to generate the feature data 124.

FIG. 14 illustrates another example of components 1400 that can be implemented in a system configured to generate adjusted face data corresponding to an avatar facial expression, such as in the device 102. The components 1400 include an event detector 1402, a context-based future speech prediction network 1410, a representation generator 1430, the image unit 226, and the face data adjuster 130. In a particular implementation, the image unit 226 and the face data adjuster 130 operate substantially as described above. In a particular implementation, the event detector 1402, the context-based future speech prediction network 1410, the representation generator 1430, or a combination thereof, are included in the feature data generator 120, such as in the audio unit 222.

The event detector 1402 is configured to process the audio data 204 to determine an event detection 1404. In a particular implementation, the event detector 1402 operates in a similar manner as described with reference to the audio event 272, the event detector 810, or both.

The context-based future speech prediction network 1410 processes the audio data 204 and the event detection 1404 (and, optionally, also processes the image data 208) to determine a prediction 1420. In some implementations, the context-based future speech prediction network 1410 corresponds to the context-based future speech prediction network 1210 of FIG. 12, and the prediction 1420 corresponds to the predicted word in context 1220. In other implementations, the context-based future speech prediction network 1410 corresponds to the context-based future speech prediction network 1310 of FIG. 13, and the prediction 1420 corresponds to the predicted speech in context 1320.

The representation generator 1430 is configured to generate a representation 1450 of the prediction 1420. In some implementations, the representation generator 1430 corresponds to the representation generator 1230, and the representation 1450 corresponds to the representation 1250. In other implementations, the representation generator 1430 corresponds to the speech representation generator 1330, and the representation 1450 corresponds to the representation 1350.

By using the event detection 1404 as an input to the context-based future speech prediction network 1410, predictions of future speech can be more accurate as compared to predictions made without knowledge of audio events. For example, if a sudden breaking of glass is detected in the audio data 204, the prediction 1420 may be informed by the additional knowledge that the user is likely to be surprised, which may not have been predictable based on the user's speech alone.

Figure 15:
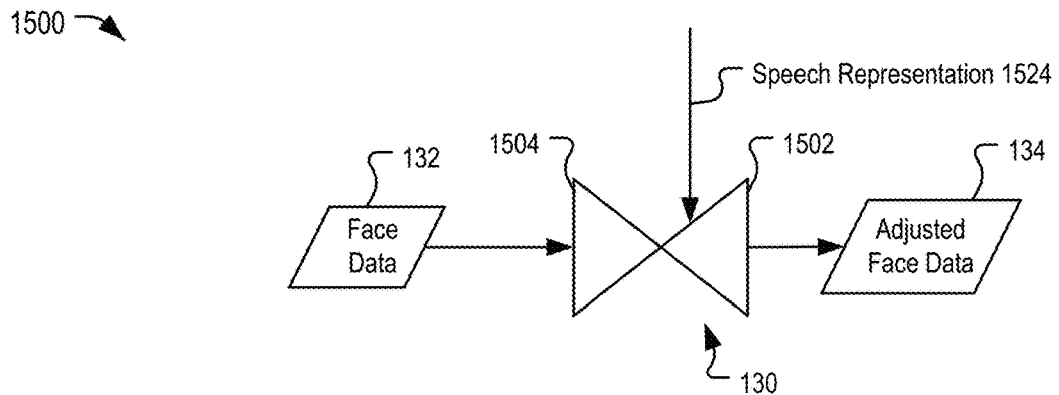
FIG. 15 is a diagram of a particular illustrative aspect of a face data adjuster that can be included in a system configured to generate adjusted face data, in accordance with some examples of the present disclosure.

FIG. 15 depicts an example 1500 of a particular implementation of the face data adjuster 130, illustrated as a deep learning architecture network that includes an encoder portion 1504 coupled to a decoder portion 1502. For example, the face data adjuster 130 can correspond to a U-net or autoencoder-type network, as illustrative, non-limiting examples.

The encoder portion 1504 is configured to process the face data 132 and to generate an output that is provided to the decoder portion 1502. The output of the encoder portion 1504 may be a reduced-dimension representation of the face data 132 and may be referred to as a code or latent vector.

The decoder portion 1502 is configured to process the output of the encoder portion 1504 in conjunction with a speech representation 1524 to generate the adjusted face data 134. In some implementations, the speech representation 1524 corresponds to an audio representation, such as the audio representation 224 of FIG. 2, one or more audio-based features, such as the one or more audio-based features 320 of FIG. 3, audio-derived features, such as the one or more audio and image based features 720 of FIG. 7 or the output 950 of FIG. 9, as illustrative examples. Examples of different implementations of how the output of the encoder portion 1504 is combined for processing with the speech representation 1524 at the decoder portion 1502 are illustrated in FIGS. 16-21.

Figure 16:
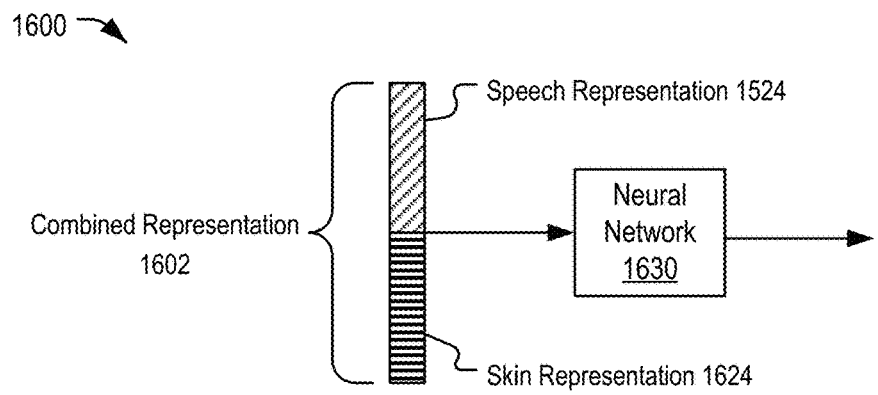
FIG. 16 is a diagram of a particular illustrative aspect of combining representations of multi-modal data that can be included in a system configured to generate adjusted face data, in accordance with some examples of the present disclosure.

FIG. 16 depicts an example 1600 in which a skin representation 1624 (e.g., the output of the encoder portion 1504) is concatenated with the speech representation 1524 to form a combined representation 1602. The combined representation 1602 is input to a neural network 1630. In a particular implementation, the neural network 1630 corresponds to the decoder portion 1502.

Figure 17:
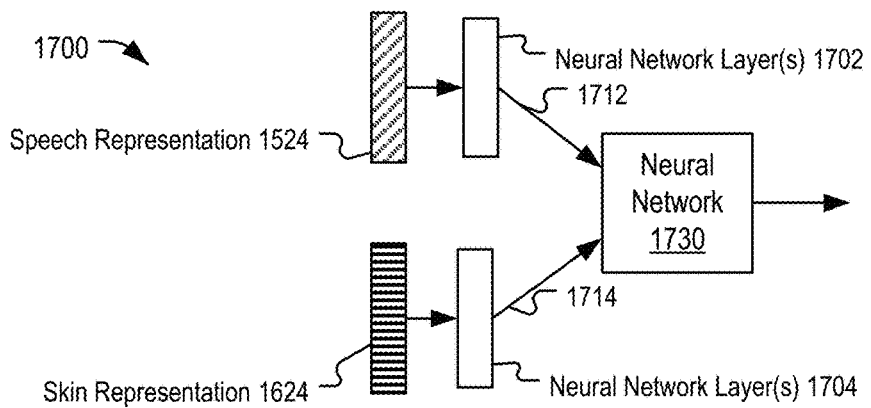
FIG. 17 is a diagram of another illustrative aspect of combining representations of multi-modal data that can be included in a system configured to generate adjusted face data, in accordance with some examples of the present disclosure.

FIG. 17 depicts an example 1700 in which the speech representation 1524 is processed at one or more neural network layers 1702 to generate an output 1712, and the skin representation 1624 is processed at one or more neural network layers 1704 to generate an output 1714. The outputs 1712 and 1714 are input to a neural network 1730, which may correspond to the decoder portion 1502. In a particular implementation, the output 1712 is concatenated with the output 1714 prior to input to the neural network 1730.

Figure 18:
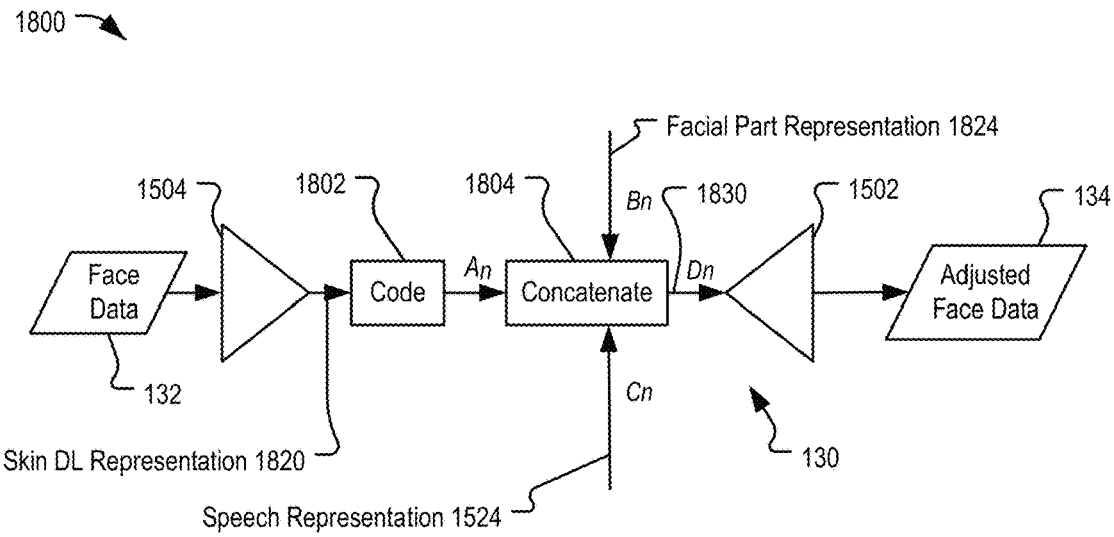
FIG. 18 is a diagram of another illustrative aspect of combining representations of multi-modal data that can be included in a system configured to generate adjusted face data, in accordance with some examples of the present disclosure.

FIG. 18 depicts an example 1800 in which the encoder portion 1504 processes the face data 132 to generate a skin deep-learned (DL) representation 1820 that is illustrated as a code 1802. A concatenate unit 1804 concatenates the code 1802 with the speech representation 1524 and a facial part representation 1824, such as the one or more image-based features 322, to generate concatenated input data 1830. For example, the concatenate unit 1804 may perform concatenation according to the equation:

$$D_n = [A_n, B_n, C_n],$$

where $D_n$ represents the concatenated input data 1830, $A_n$ represents the code 1802, $B_n$ represents the facial part representation 1824, and $C_n$ represents the speech representation 1524. The concatenated input data 1830 is processed by the decoder portion 1502 to generate the adjusted face data 134.

Figure 19:
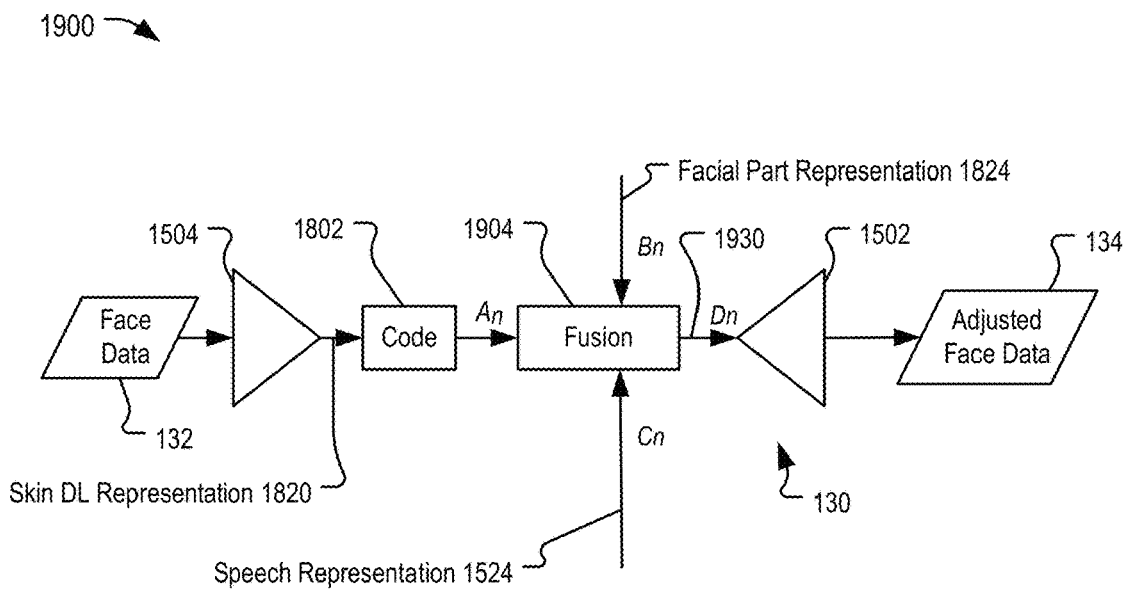
FIG. 19 is a diagram of another illustrative aspect of combining representations of multi-modal data that can be included in a system configured to generate adjusted face data, in accordance with some examples of the present disclosure.

FIG. 19 depicts an example 1900 in which a fusion unit 1904 performs a latent-space fusion operation of the code 1802, the speech representation 1524, and the facial part representation 1824 to generate a fused input 1930. For example, the fusion unit 1904 may perform fusion according to one or more equations, such as a weighted sum, a Hadamard equation or transform, an elementwise product, etc. In a particular example, the fusion unit 1904 performs fusion according to the equation:

$$D_n = \alpha A_n + \beta B_n + \gamma C_n,$$

where $D_n$ represents the fused input 1930, $\alpha$, $\beta$, and $\gamma$ represent weighting factors, $A_n$ represents the code 1802, $B_n$ represents the facial part representation 1824, and $C_n$ represents the speech representation 1524. The fused input 1930 is processed by the decoder portion 1502 to generate the adjusted face data 134.

Figure 20:
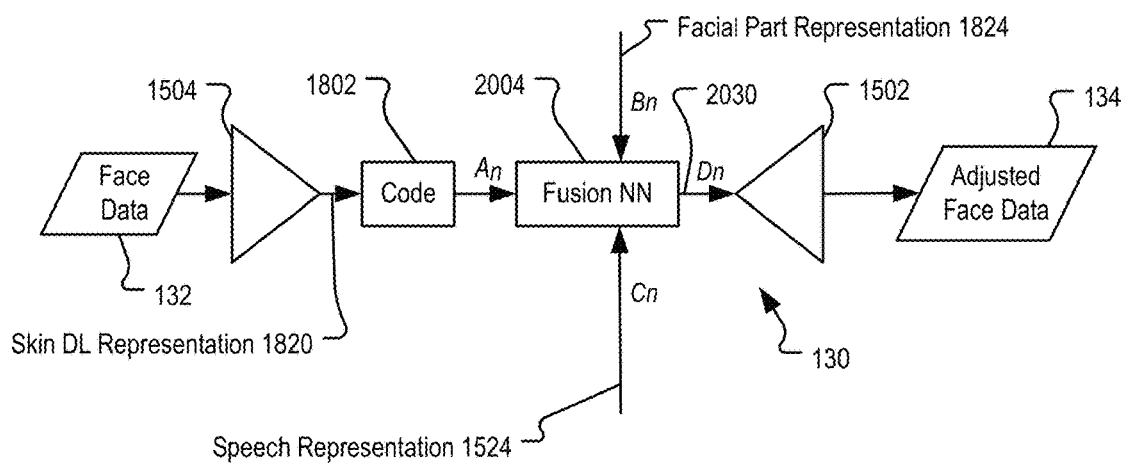
FIG. 20 is a diagram of another illustrative aspect of combining representations of multi-modal data that can be included in a system configured to generate adjusted face data, in accordance with some examples of the present disclosure.

FIG. 20 depicts an example 2000 in which the fusion unit 1904 of FIG. 19 is replaced by a fusion neural network 2004. The fusion neural network 2004 is configured to perform fusion of the code 1802, the speech representation 1524, and the facial part representation 1824 using network layers, such as one or more fully-connected or convolutional layers, to generate a fused input 2030 for the decoder portion 1502.

Figure 21:
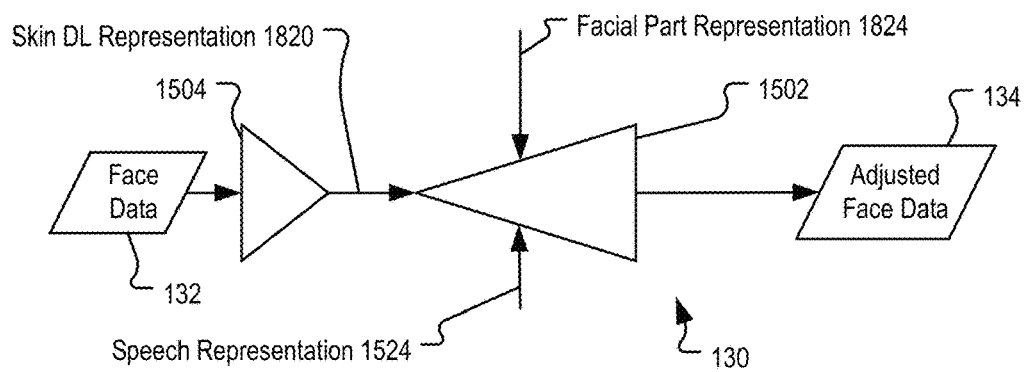
FIG. 21 is a diagram of another illustrative aspect of combining representations of multi-modal data that can be included in a system configured to generate adjusted face data, in accordance with some examples of the present disclosure.

FIG. 21 depicts another example 2100 in which fusion of the various codes (e.g., the code 1802, the speech representation 1524, and the facial part representation 1824) is performed at the decoder portion 1502. For example, the decoder portion 1502 may process the code 1802 at an input layer followed by a sequence of layers that perform up-convolution. The speech representation 1524 and the facial part representation 1824 can be fused at the decoder portion 1502, such as provided as inputs at one or more of the of up-convolution layers instead of at the input layer.

Figure 22:
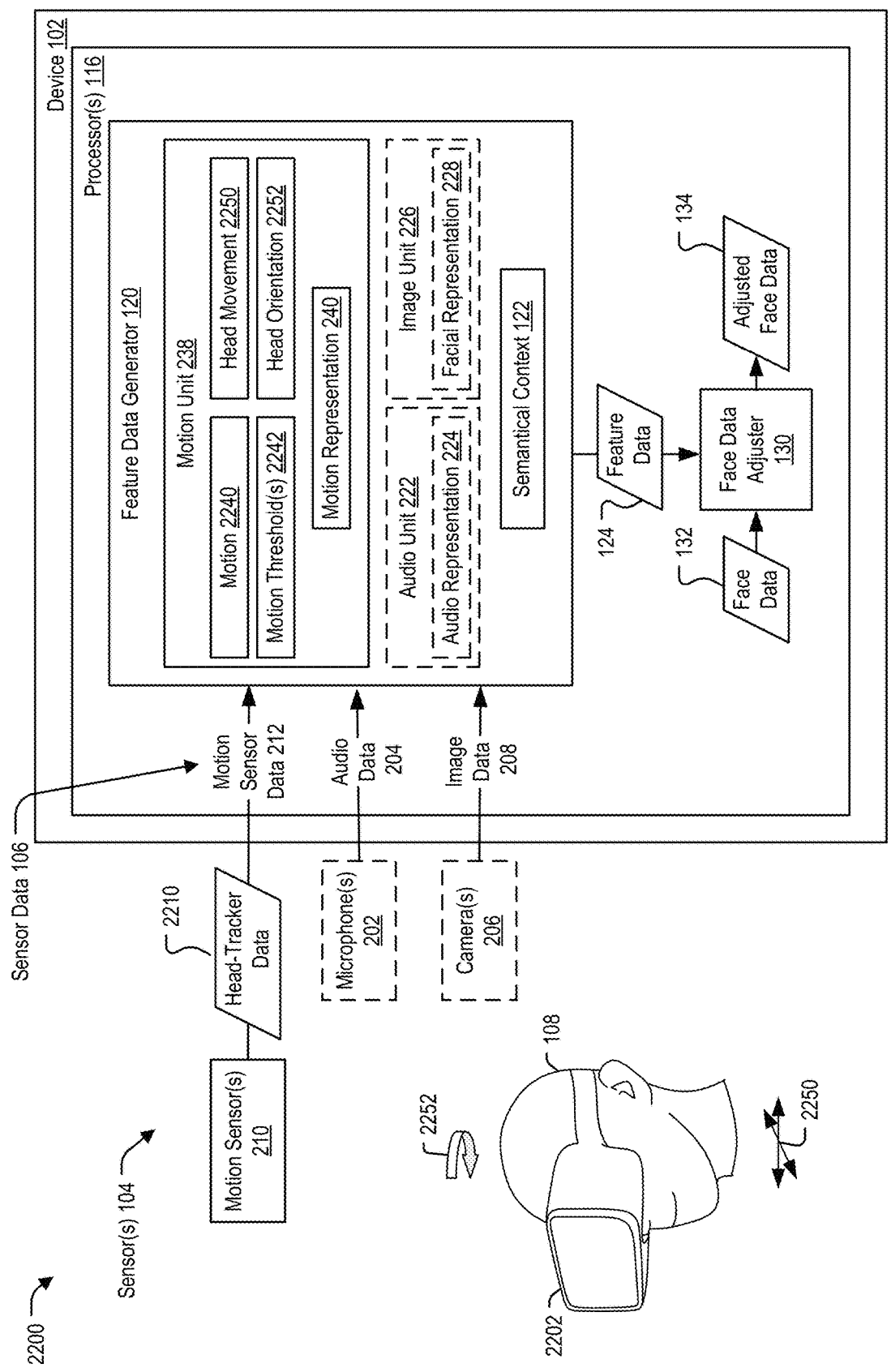
FIG. 22 is a block diagram of a particular illustrative aspect of a system configured to generate adjusted face data corresponding to an avatar facial expression based on a semantical context associated with motion sensor data, in accordance with some examples of the present disclosure.

FIG. 22 depicts an example of a system 2200 in which the one or more motion sensors 210 are coupled to (e.g., integrated in) a head-mounted device 2202, such as an HMD, and configured to generate the motion sensor data 212 that is included in the sensor data 106. For example, the one or more motion sensors 210 can include an inertial measurement unit (IMU), one or more other sensors configured to detect movement, acceleration, orientation, or a combination thereof. As illustrated, the motion sensor data 212 includes head-tracker data 2210 that indicates at least one of a head movement 2250 or a head orientation 2252 of the user 108.

The device 102 includes the one or more processors 116 that implement the feature data generator 120 and the face data adjuster 130 in a similar manner as described in FIG. 2. In a particular implementation, the one or more processors 116 are configured to determine the semantical context 122 based on comparing a motion 2240 represented in the motion sensor data 212 to at least one motion threshold 2242. For example, the motion 2240 (e.g., the head movement 2250, the head orientation 2252, or a combination thereof) exceeding the motion threshold 2242 within a relatively short time period can indicate a sudden reaction of the user to an external event, such as a startled or surprised reaction. As another example, head movements of the user 108 can represent gestures that convey meaning. To illustrate, up-and-down nodding can indicate agreement or a positive emotional state of the user 108, side-to-side shaking can indicate disagreement or a negative emotional state, a head tilt to one side can indicate confusion, etc.

Thus, the feature data generator 120 generates the feature data 124 based on the motion sensor data 212, and the face data adjuster 130 generates the adjusted face data 134 based on the feature data 124. The adjusted face data 134 can correspond to an avatar facial expression that is based on the semantical context 122 that is derived from the motion sensor data 212 (and that, in some implementations, is not derived from any image data or audio data).

Optionally, the feature data generator 120 may also include the audio unit 222 configured to generate the audio representation 224 based on the audio data 204. In such implementations, the feature data 124 may include additional information derived from the audio data 204 and may therefore provide additional realism or accuracy for the generation of the avatar as compared to only using the motion sensor data 212. Optionally, the system 2200 also includes the one or more microphones 202, such as one or more microphones integrated in or attached to the head-mounted device 2202.

Optionally, the feature data generator 120 may include the image unit 226 configured to generate the facial representation 228 based on the image data 208. In such implementations, the feature data 124 may include additional information derived from the image data 208 and may therefore provide additional realism or accuracy for the generation of the avatar as compared to only using the motion sensor data 212. Optionally, the system 2200 also includes the one or more cameras 206, such as multiple cameras integrated in or attached to the head-mounted device 2202 and configured to generate the image data 208A, 208B, and 208C of FIG. 2.

Additional synergetic effects may arise by using combinations of the motion sensor data 212 with one or both of the audio data 204 or the image data 208. For example, if the user 108 makes a positive statement such as "that's a great idea" while the user's head is shaking from side to side, the shaking motion alone may be interpreted as disagreement or negative emotion, while the user's speech alone may be interpreted as agreement or positive emotion. However, the combination of the user's speech and head motion may enable the device to more accurately determine that the user 108 is expressing sarcasm. A similar synergy can result from using a combination of the image data 208 and the motion sensor data 212. For example, the user expressing a broad smile (e.g., a visual manifestation of joy) while the user's head is shaking from side to side (e.g., a gesture of disagreement of negative emotion) may more accurately be determined to be an expression of amused disbelief.

Figures 23, 24:
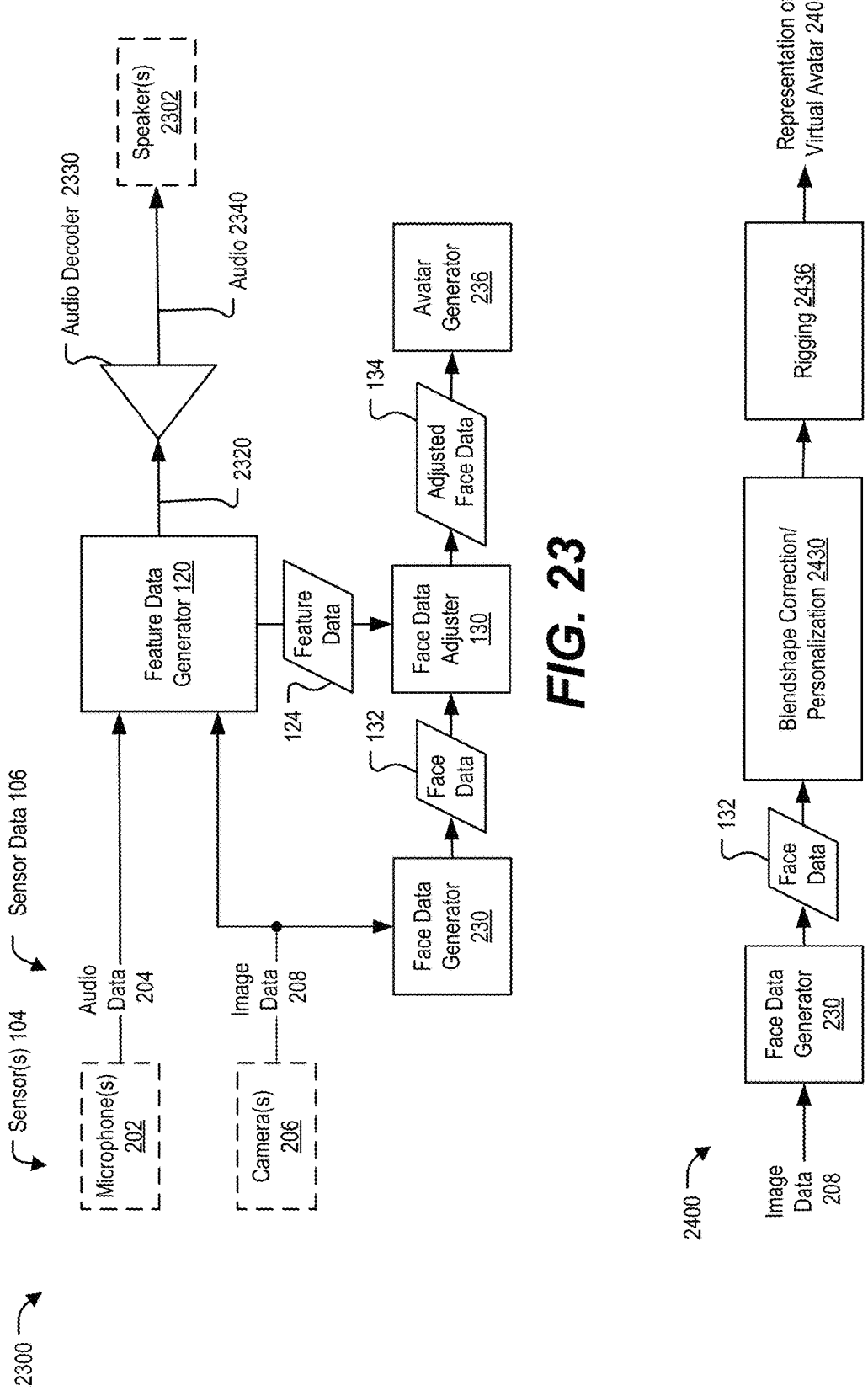
FIG. 23 is a block diagram of a particular illustrative aspect of components that can be included in a system configured to generate adjusted face data and audio associated with an avatar, in accordance with some examples of the present disclosure.
FIG. 24 is a block diagram of a particular illustrative aspect of components that can be included in a system configured to generate adjusted face data associated with an avatar, in accordance with some examples of the present disclosure.

FIG. 23 depicts an example of a system 2300 in which an output 2320 of the feature data generator 120 is used to generate audio 2340 associated with the avatar 154. The system 2300 includes the feature data generator 120, the face data generator 230, the face data adjuster 130, and the avatar generator 236 that operate in a similar manner as described above. The output 2320 of the feature data generator 120 is processed by an audio decoder 2330 to generate the audio 2340. In some implementations, the audio 2340 can be transmitted to a second device (e.g., a headset of a user of the system 2300, a device of a remote user, a server, etc.) for playback of the audio 2340. Optionally, the system 2300 includes one or more speakers 2302 configured to play out the audio 2340.

According to some implementations, the output 2320 is based on the audio data 204 independently of any image data 208. For example, the feature data generator 120 may be configured to process the audio data 204 to generate the output 2320 representing a modified version of the user's speech. For example, the feature data generator 120 (e.g., the audio unit 222) may generate the output 2320 as the user's speech in a different voice than the user's voice (e.g., to correspond to a different avatar or to otherwise change the user's voice). Alternatively, or in addition, the output 2320 may be encoded to modify (e.g., enhance, reduce, or change) an accent in the user's speech to improve intelligibility for a listener, to modify the user's voice such as when the user is sick and desires the avatar to have a more robust voice, to have the avatar speak in a different style than the user (e.g., more calm or steady than the user's speech), or to change the language in which the avatar speaks, as non-limiting examples. Because generating the avatar's speech based on changing aspects of the user's speech can cause a misalignment between the avatar's facial movements and the avatar's speech, the output 2320 (or information associated with the output 2320) may also be included in the feature data 124 to adjust the avatar's facial expressions to more closely match the avatar's speech.

According to some implementations, the output 2320 is based on the audio data 204 in conjunction with the image data 208. For example, as described previously, the image data 208 can help with disambiguating the user's speech in the audio data 204, such as in noisy or windy environments that result in low-quality capture of the user's speech by the one or more microphones 202.

According to some implementations, the output 2320 is based on the image data 208 independently of any audio data 204. For example, the system 2300 may operate in a lip-reading mode in which the audio 2340 is generated based on the user's facial expressions and movements, such as in very noisy environments or when the one or more microphones 202 are disabled, or for privacy such as while using public transportation or in a library, or if the user has a physical condition that prevents the user from speaking, as illustrative, non-limiting examples.

FIG. 24 illustrates an example of components 2400 that can be implemented in a system configured to generate a facial expression for a virtual avatar, such as a fanciful character or creature. The components 2400 include the face data generator 230 and a blendshape correction/personalization engine 2430 configured to process (e.g., deform) the face data 132 (e.g., a mesh of the user's face) at least partially based on the feature data 124 to generate adjusted face data that is processed by a rigging unit 2436 to generate a representation 2408 of the virtual avatar. For example, the components 2400 can be implemented in any of the systems of FIG. 1-23, such as replacing the face data adjuster 130 and the avatar generator 236 with the blendshape correction/personalization engine 2430 and the rigging unit 2436.

Figure 25:
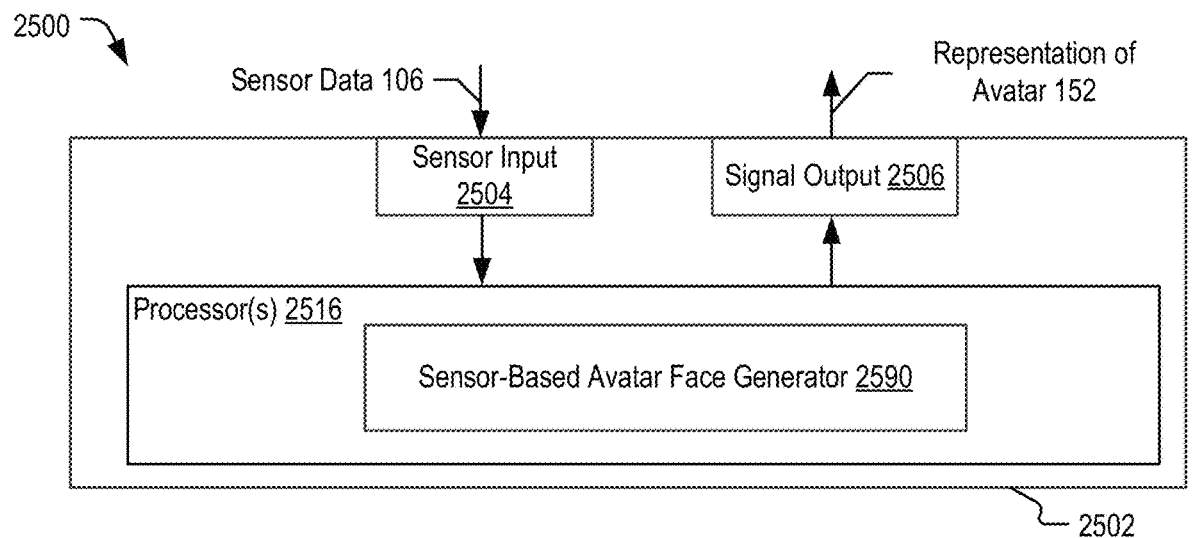
FIG. 25 illustrates an example of an integrated circuit that includes a sensor-based avatar face generator, in accordance with some examples of the present disclosure.

FIG. 25 depicts an implementation 2500 of the device 102 as an integrated circuit 2502 that includes a sensor-based avatar face generator. For example, the integrated circuit 2502 includes one or more processors 2516. The one or more processors 2516 can correspond to the one or more processors 116. The one or more processors 2516 include a sensor-based avatar face generator 2590. The sensor-based avatar face generator 2590 includes the feature data generator 120 and the face data adjuster 130 and may optionally also include the face data generator 230 and avatar generator 236; alternatively, the sensor-based avatar face generator 2590 may include the feature data generator 120, the face data generator 230, the blendshape correction/personalization engine 2430, and the rigging unit 2436, as illustrative, non-limiting examples.

The integrated circuit 2502 also includes a sensor input 2504, such as one or more bus interfaces, to enable the sensor data 106 to be received for processing. The integrated circuit 2502 also includes a signal output 2506, such as a bus interface, to enable sending of the representation 152 of the avatar 154.

Figure 26:
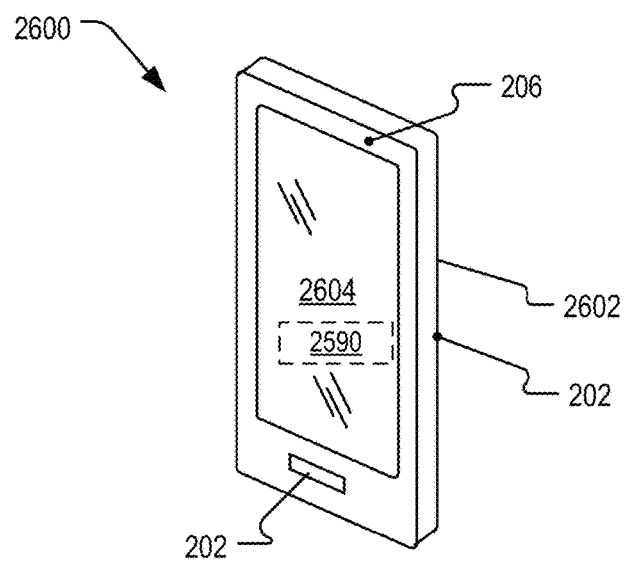
FIG. 26 is a diagram of a mobile device that includes a sensor-based avatar face generator, in accordance with some examples of the present disclosure.
Figure 27:
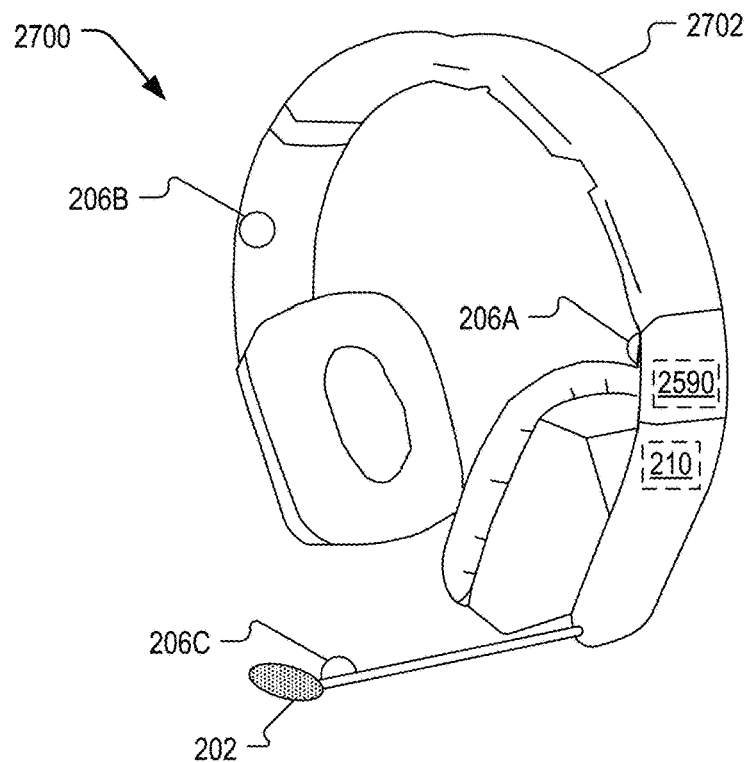
FIG. 27 is a diagram of a headset that includes a sensor-based avatar face generator, in accordance with some examples of the present disclosure.
Figure 28:
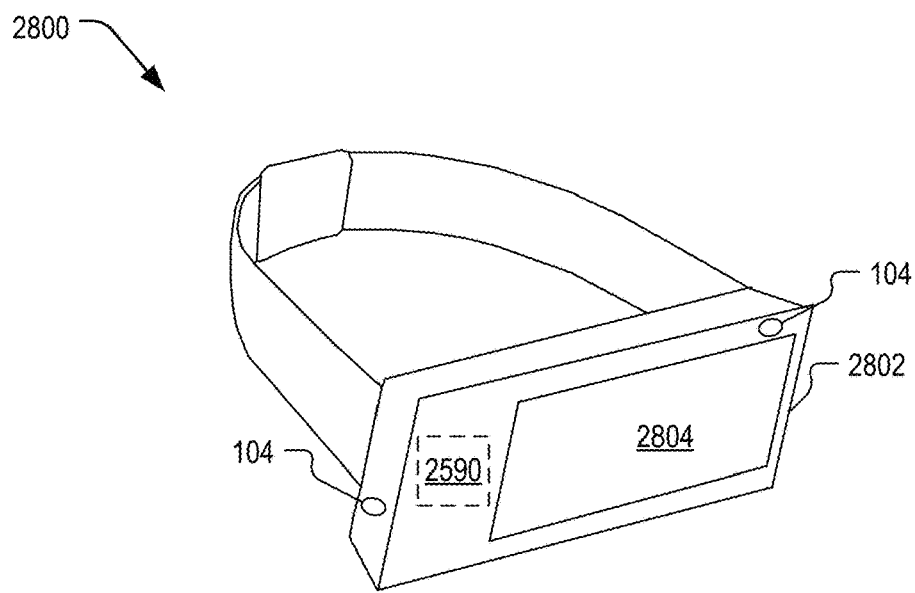
FIG. 28 is a diagram of a wearable electronic device that includes a sensor-based avatar face generator, in accordance with some examples of the present disclosure.
Figure 29:
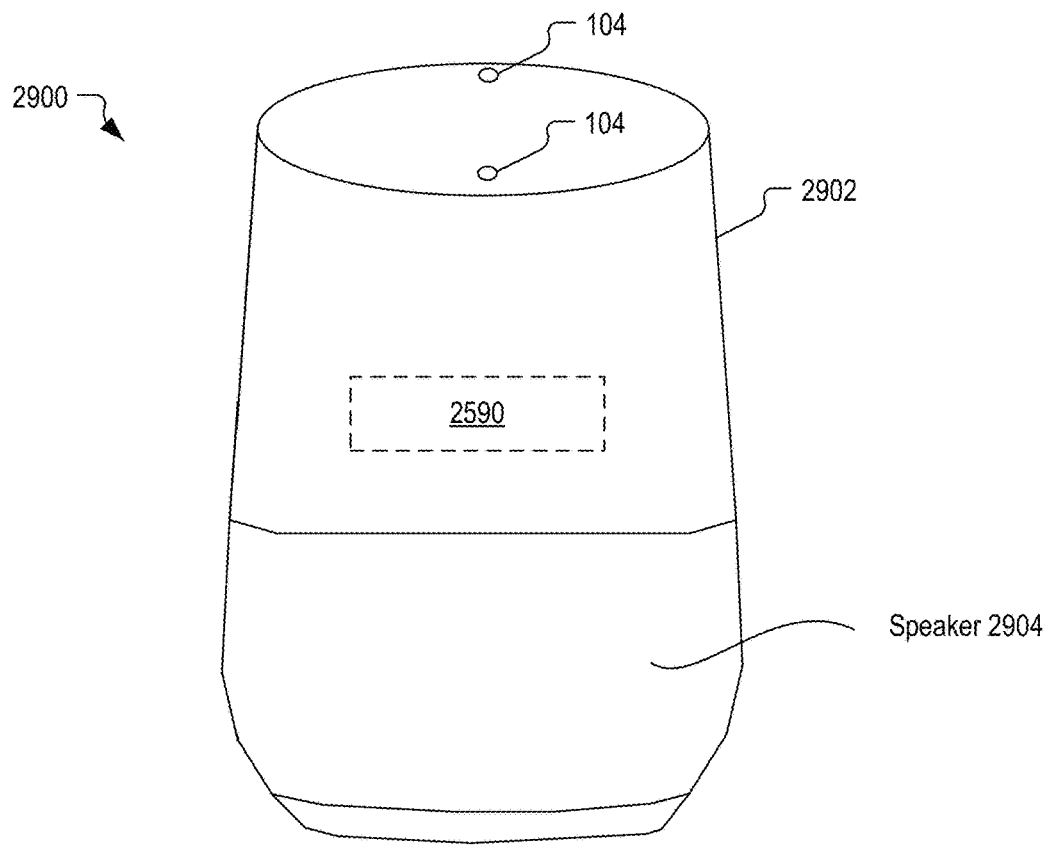
FIG. 29 is a diagram of a voice-controlled speaker system that includes a sensor-based avatar face generator, in accordance with some examples of the present disclosure.
Figure 30:
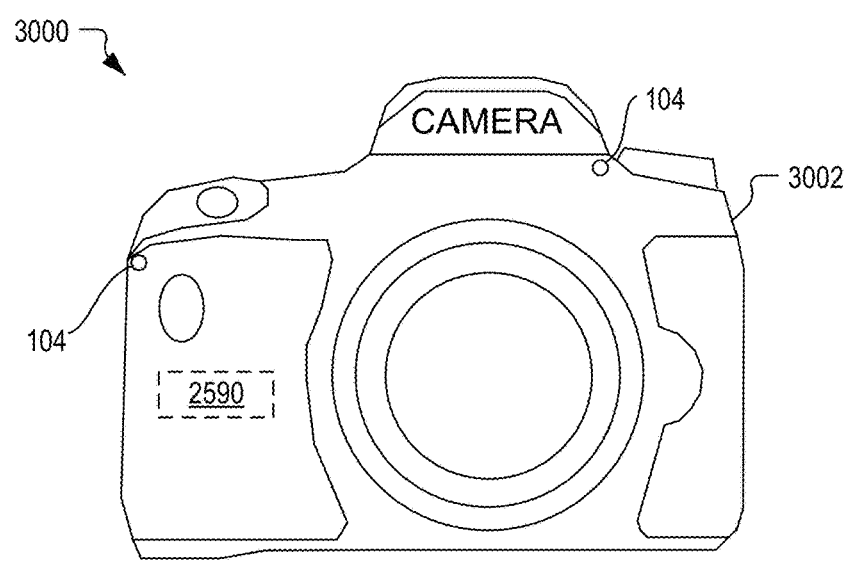
FIG. 30 is a diagram of a camera that includes a sensor-based avatar face generator, in accordance with some examples of the present disclosure.
Figure 31:
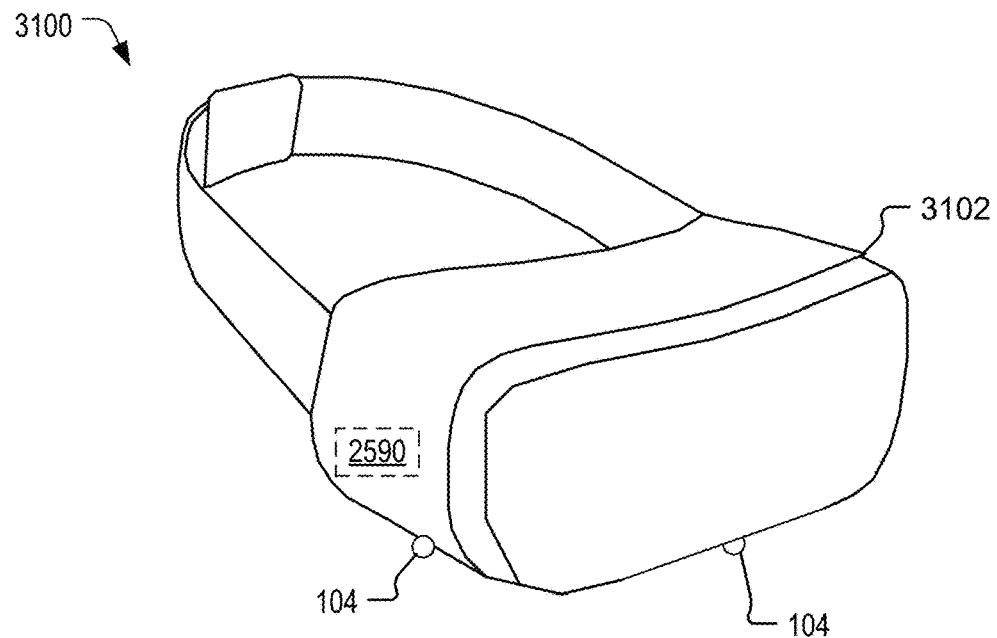
FIG. 31 is a diagram of an extended reality headset, such as a virtual reality, mixed reality, or augmented reality headset, that includes a sensor-based avatar face generator, in accordance with some examples of the present disclosure.
Figure 32:
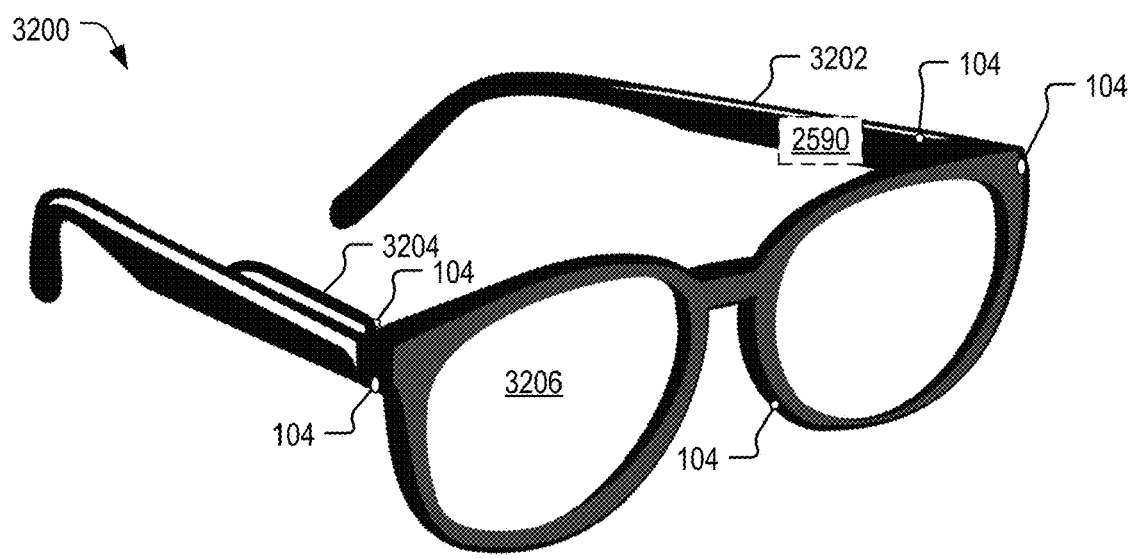
FIG. 32 is a diagram of a mixed reality or augmented reality glasses device that includes a sensor-based avatar face generator, in accordance with some examples of the present disclosure.
Figure 33:
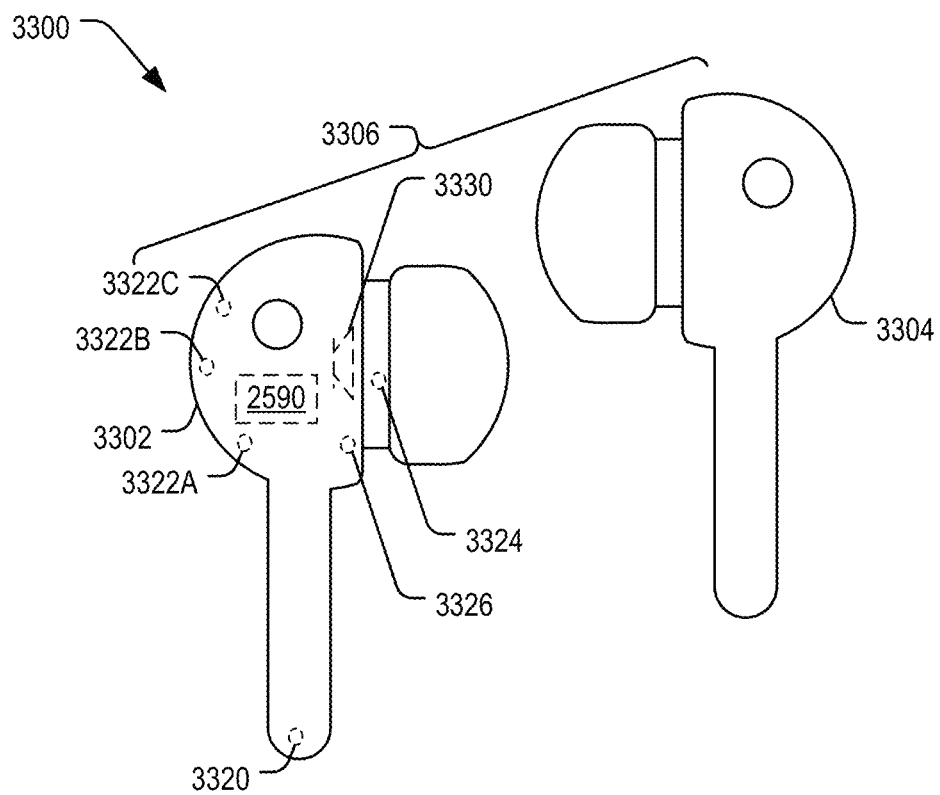
FIG. 33 is a diagram of earbuds that include a sensor-based avatar face generator, in accordance with some examples of the present disclosure.
Figure 34:
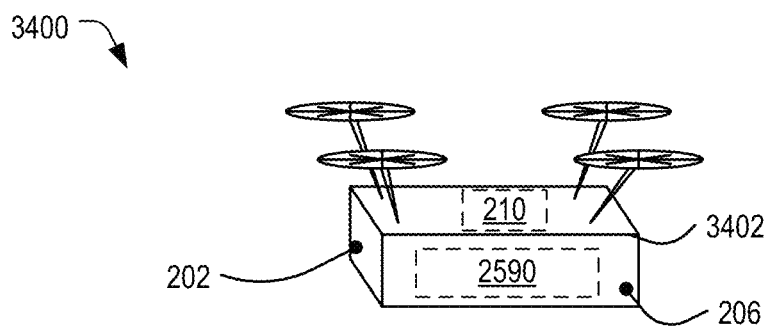
FIG. 34 is a diagram of a first example of a vehicle that includes a sensor-based avatar face generator, in accordance with some examples of the present disclosure.
Figure 35:
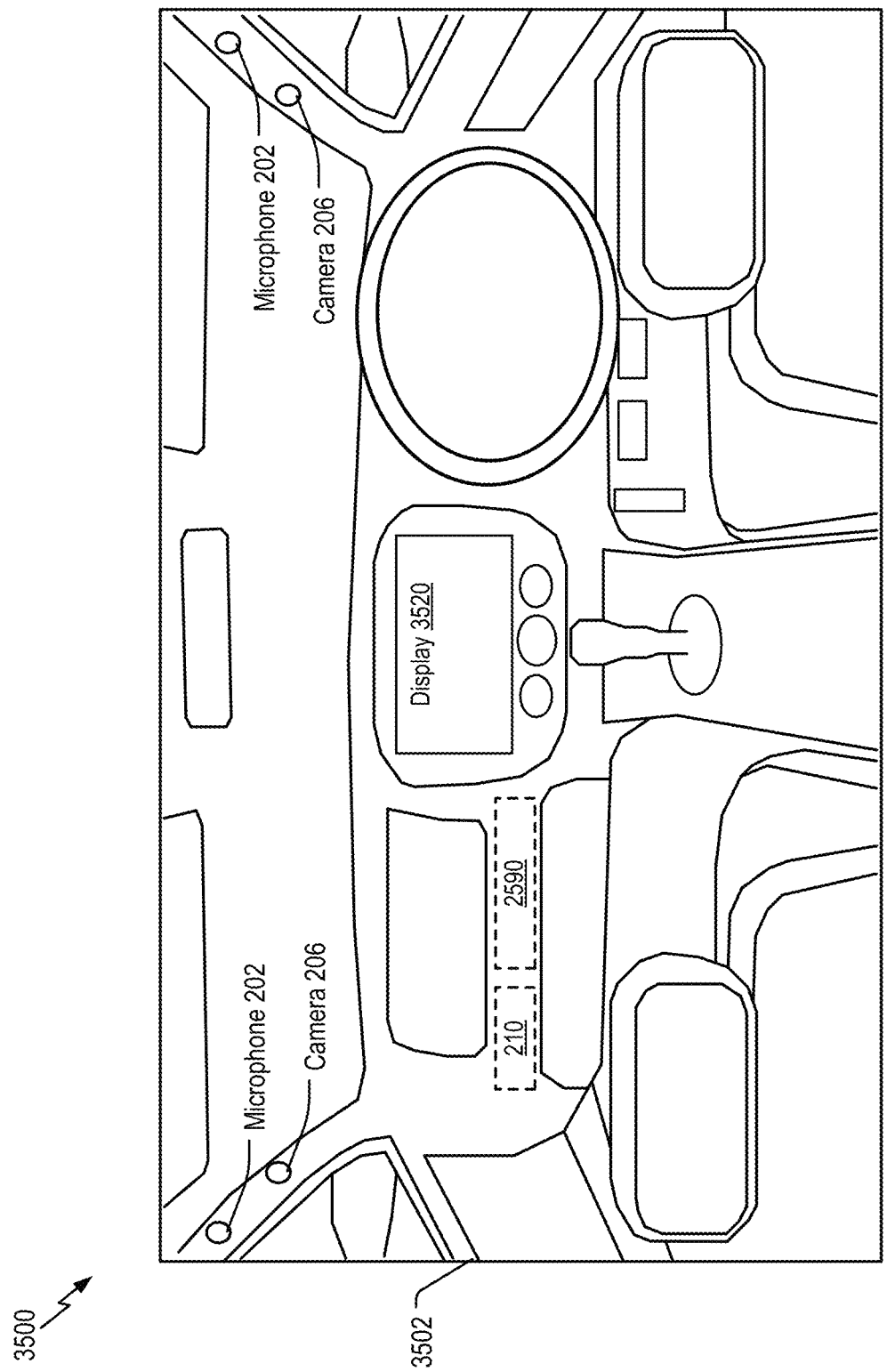
FIG. 35 is a diagram of a second example of a vehicle that includes a sensor-based avatar face generator, in accordance with some examples of the present disclosure.

The integrated circuit 2502 enables sensor-based avatar face generation as a component in a system that includes one or more sensors, such as a mobile phone or tablet as depicted in FIG. 26, a headset as depicted in FIG. 27, a wearable electronic device as depicted in FIG. 28, a voice-controlled speaker system as depicted in FIG. 29, a camera as depicted in FIG. 30, a virtual reality headset, mixed reality headset, or an augmented reality headset as depicted in FIG. 31, augmented reality glasses or mixed reality glasses as depicted in FIG. 32, a set of in-ear devices, as depicted in FIG. 33, or a vehicle as depicted in FIG. 34 or FIG. 35.

FIG. 26 depicts an implementation 2600 in which the device 102 is a mobile device 2602, such as a phone or tablet, as illustrative, non-limiting examples. The mobile device 2602 includes one or more microphones 202, one or more cameras 206, and a display screen 2604. The sensor-based avatar face generator 2590 is integrated in the mobile device 2602 and is illustrated using dashed lines to indicate internal components that are not generally visible to a user of the mobile device 2602. In a particular example, the sensor-based avatar face generator 2590 may function to generate the representation 152 of the avatar 154, which may then be displayed at the display screen 2604 (e.g., in conjunction with one or more avatars representing one or more participants in an online activity).

FIG. 27 depicts an implementation 2700 in which the device 102 is a headset device 2702. The headset device 2702 includes a microphone 202, a left-eye region facing camera 206A, a right-eye region facing camera 206B, a mouth-facing camera 206C, and one or more motion sensors 210. The sensor-based avatar face generator 2590 is integrated in the headset device 2702. In a particular example, the sensor-based avatar face generator 2590 may function to generate the feature data 124, the adjusted face data 134, the representation 152 of the avatar 154, or a combination thereof, which the headset device 2702 may transmit to a second device (not shown) for further processing, for display of the avatar 154, or a combination thereof.

FIG. 28 depicts an implementation 2800 in which the device 102 is a wearable electronic device 2802, illustrated as a "smart watch." The sensor-based avatar face generator 2590 and one or more sensors 104 (e.g., one or more microphones, cameras, motion sensors, or a combination thereof) are integrated into the wearable electronic device 2802. In a particular example, the sensor-based avatar face generator 2590 may function to generate the feature data 124, the adjusted face data 134, the representation 152 of the avatar 154, or a combination thereof, which the wearable electronic device 2802 may transmit to a second device (not shown) for further processing, for display of the avatar 154, or a combination thereof. In a particular example, the sensor-based avatar face generator 2590 may function to generate the representation 152 of the avatar 154, which may then be displayed at the display screen 2804 (e.g., in conjunction with one or more avatars representing one or more participants in an online activity).

FIG. 29 is an implementation 2900 in which the device 102 is a wireless speaker and voice activated device 2902. The wireless speaker and voice activated device 2902 can have wireless network connectivity and is configured to execute an assistant operation. The sensor-based avatar face generator 2590 and multiple sensors 104 (e.g., one or more microphones, cameras, motion sensors, or a combination thereof), are included in the wireless speaker and voice activated device 2902. The wireless speaker and voice activated device 2902 also includes a speaker 2904. In a particular aspect, the speaker 2904 corresponds to the speaker 2302 of FIG. 23. During operation, the sensor-based avatar face generator 2590 may function to generate the representation 152 of the avatar 154 based on features of a user that are captured by the sensors 104 and may also determine whether a keyword was uttered by the user. In response to a determination that a keyword was uttered, the wireless speaker and voice activated device 2902 can execute assistant operations, such as via execution of an integrated assistant application. The assistant operations can include initiating or joining an online activity with one or more other participants, such as an online game or virtual conference, in which the user is represented by the avatar 154. For example, the wireless speaker and voice activated device 2902 may send the representation 152 of the avatar 154 to another device (e.g., a gaming server) that can include the avatar 154 in a virtual setting that is shared by the other participants. The assistant operations can also include adjusting a temperature, playing music, turning on lights, etc. For example, the assistant operations are performed responsive to receiving a command after a keyword or key phrase (e.g., "hello assistant").

FIG. 30 depicts an implementation 3000 in which the device 102 is a portable electronic device that corresponds to a camera device 3002. The sensor-based avatar face generator 2590 and multiple sensors 104 (e.g., one or more microphones, cameras, motion sensors, or a combination thereof) are included in the camera device 3002. During operation, the sensor-based avatar face generator 2590 may function to generate the feature data 124, the adjusted face data 134, the representation 152 of the avatar 154, or a combination thereof, which the camera device 3002 may transmit to a second device (not shown) for further processing, for display of the avatar 154, or a combination thereof.

FIG. 31 depicts an implementation 3100 in which the device 102 includes a portable electronic device that corresponds to an extended reality ("XR") headset 3102, such as a virtual reality ("VR"), augmented reality ("AR"), or mixed reality ("MR") headset device. The sensor-based avatar face generator 2590, multiple sensors 104 (e.g., one or more microphones, cameras, motion sensors, or a combination thereof), or a combination thereof, are integrated into the XR headset 3102. The sensor-based avatar face generator 2590 may function to generate the feature data 124, the adjusted face data 134, the representation 152 of the avatar 154, or a combination thereof, based on audio data, image data, motion sensor data, or a combination thereof, received from the sensors 104 of the XR headset 3102, and which the XR headset 3102 may transmit to a second device (e.g., a remote server) for further processing, for display of the avatar 154, for distribution of the avatar 154 to other participants in a virtual setting that is shared by the other participants, or a combination thereof.

The XR headset 3102 includes a visual interface device positioned in front of the user's eyes to enable display of augmented reality or virtual reality images or scenes to the user while the XR headset 3102 is worn. In a particular example, the visual interface device is configured to display the user's avatar 154, one or more avatars associated with other participants in a shared virtual setting, or a combination thereof.

FIG. 32 depicts an implementation 3200 in which the device 102 includes a portable electronic device that corresponds to augmented reality or mixed reality glasses 3202. The glasses 3202 include a holographic projection unit 3204 configured to project visual data onto a surface of a lens 3206 or to reflect the visual data off of a surface of the lens 3206 and onto the wearer's retina. The sensor-based avatar face generator 2590, multiple sensors 104 (e.g., one or more microphones, cameras, motion sensors, or a combination thereof), or a combination thereof, are integrated into the glasses 3202. The sensor-based avatar face generator 2590 may function to generate the feature data 124, the adjusted face data 134, the representation 152 of the avatar 154, or a combination thereof, based on audio data, image data, motion sensor data, or a combination thereof, received from the sensors 104 of the glasses 3202, and which the glasses 3202 may transmit to a second device (e.g., a remote server) for further processing, for display of the avatar 154, for distribution of the avatar 154 to other participants in a virtual setting that is shared by the other participants, or a combination thereof.

In a particular example, the holographic projection unit 3204 is configured to display the avatar 154, one or more other avatars associated with other users or participants, or a combination thereof. For example, the avatar 154, the one or more other avatars, or a combination thereof, can be superimposed on the user's field of view at particular positions that coincides with relative locations of users in a shared virtual environment that superimposed on the user's field of view.

FIG. 33 depicts an implementation 3300 in which the device 102 includes a portable electronic device that corresponds to a pair of earbuds 3306 that includes a first earbud 3302 and a second earbud 3304. Although earbuds are described, it should be understood that the present technology can be applied to other in-ear or over-ear playback devices.

The first earbud 3302 includes a first microphone 3320, such as a high signal-to-noise microphone positioned to capture the voice of a wearer of the first earbud 3302, an array of one or more other microphones configured to detect ambient sounds and spatially distributed to support beamforming, illustrated as microphones 3322A, 3322B, and 3322C, an "inner" microphone 3324 proximate to the wearer's ear canal (e.g., to assist with active noise cancelling), and a self-speech microphone 3326, such as a bone conduction microphone configured to convert sound vibrations of the wearer's ear bone or skull into an audio signal.

In a particular implementation, the microphones 3320, 3322A, 3322B, and 3322C correspond to the one or more microphones 202, and audio signals generated by the microphones 3320 3322A, 3322B, and 3322C are provided to the sensor-based avatar face generator 2590. The sensor-based avatar face generator 2590 may function to generate the feature data 124, the adjusted face data 134, the representation 152 of the avatar 154, or a combination thereof, which the first earbud 3302 may transmit to a second device (not shown) for further processing, for display of the avatar 154, or a combination thereof. In some implementations, the sensor-based avatar face generator 2590 may further be configured to process audio signals from one or more other microphones of the first earbud 3302, such as the inner microphone 3324, the self-speech microphone 3326, or both.

The second earbud 3304 can be configured in a substantially similar manner as the first earbud 3302. In some implementations, the sensor-based avatar face generator

2590 of the first earbud 3302 is also configured to receive one or more audio signals generated by one or more microphones of the second earbud 3304, such as via wireless transmission between the earbuds 3302, 3304, or via wired transmission in implementations in which the earbuds 3302, 3304 are coupled via a transmission line. In other implementations, the second earbud 3304 also includes a sensor-based avatar face generator 2590, enabling techniques described herein to be performed by a user wearing a single one of either of the earbuds 3302, 3304.

In some implementations, the earbuds 3302, 3304 are configured to automatically switch between various operating modes, such as a passthrough mode in which ambient sound is played via a speaker 3330, a playback mode in which non-ambient sound (e.g., streaming audio corresponding to a phone conversation, media playback, video game, etc.) is played back through the speaker 3330, and an audio zoom mode or beamforming mode in which one or more ambient sounds are emphasized and/or other ambient sounds are suppressed for playback at the speaker 3330. In other implementations, the earbuds 3302, 3304 may support fewer modes or may support one or more other modes in place of, or in addition to, the described modes.

In an illustrative example, the earbuds 3302, 3304 can automatically transition from the playback mode to the passthrough mode in response to detecting the wearer's voice, and may automatically transition back to the playback mode after the wearer has ceased speaking. In some examples, the earbuds 3302, 3304 can operate in two or more of the modes concurrently, such as by performing audio zoom on a particular ambient sound (e.g., a dog barking) and playing out the audio zoomed sound superimposed on the sound being played out while the wearer is listening to music (which can be reduced in volume while the audio zoomed sound is being played). In this example, the wearer can be alerted to the ambient sound associated with the audio event without halting playback of the music.

FIG. 34 depicts an implementation 3400 in which disclosed techniques are implemented in a vehicle 3402, illustrated as a manned or unmanned aerial device (e.g., a personal aircraft, a surveillance drone, etc.). A sensor-based avatar face generator 2590, one or more microphones 202, one or more cameras 206, one or more motion sensors 210, or a combination thereof, are integrated into the vehicle 3402.

In some implementations in which the vehicle 3402 is configured to transport a user, one or more of the microphones 202 and the cameras 206 may be directed toward the user to capture audio data representing the user's speech and image data representing the user's face for generation of an avatar of the user with enhanced accuracy or realism. The one or motion sensors 210 may be configured to capture motion data associated with the flight of the vehicle 3402, enabling more accurate prediction of the user's facial expression (or expected future expression), such as surprise or fear in response to sudden or unexpected movement (e.g., erratic motion due to turbulence), joy or excitement in response to other movements, such as during climbing, descending, or banking maneuvers, etc.

In some implementations in which the vehicle 3402 is configured as a surveillance drone, one or more of the microphones 202 and the cameras 206 may be directed toward a particular person being surveilled (e.g., a "user") to capture audio data representing the user's speech and image data representing the user's face for generation of an avatar of the user with enhanced accuracy or realism. The one or motion sensors 210 may be configured to capture motion data associated with the flight of the vehicle 3402, which may be used as a proxy for motion of the user. To illustrate, the vehicle 3402 may be configured to follow the user, and therefore the speed of the vehicle 3402 can indicate a pace of the user (e.g., stationary, casual walking, sprinting, etc.). In some examples, one or more of the motion sensors 210 can also, or alternatively, include a camera configured to track body movements of the user that may provide context for a predicted or expected future expression of the user, such as a sudden turn or the user's head or body indicating that the user has been startled, a reclining of the user's body on a chair or flat surface indicating that the user is relaxed, etc.

FIG. 35 depicts another implementation 3500 in which disclosed techniques are implemented in a vehicle 3502, illustrated as a car. A sensor-based avatar face generator 2590, one or more microphones 202, one or more cameras 206, one or more motion sensors 210, or a combination thereof, are integrated into the vehicle 3502.

One or more of the microphones 202 and the cameras 206 may be directed toward a user (e.g., an operator or passenger of the vehicle 3502) to capture audio data representing the user's speech and image data representing the user's face for generation of an avatar of the user with enhanced accuracy or realism. The one or motion sensors 210 may be configured to capture motion data associated with movement of the vehicle 3502, enabling more accurate prediction of the user's facial expression (or expected future expression), such as surprise or fear in corresponding to sudden or unexpected movement (e.g., due to sudden braking, swerving, or collision), joy or excitement in response to other movements, such as brisk acceleration or slalom-like motion, etc.

In some implementations, the sensor-based avatar face generator 2590 may function to generate the feature data 124, the adjusted face data 134, the representation 152 of the avatar 154, or a combination thereof, which the vehicle 3502 may transmit to a second device (not shown) for further processing, for display of the avatar 154, or a combination thereof. In some implementations, the sensor-based avatar face generator 2590 may function to generate the representation 152 of the avatar 154, which may then be displayed at a display screen 3520 (e.g., in conjunction with one or more avatars representing one or more participants in an online activity). For example, the vehicle 3502 can include a set of cameras 206 and microphones 202, and a display device (e.g., a seat-back display screen) for each occupant of the vehicle 3502, and a game engine included in the vehicle 3502 may enable multiple occupants of the vehicle to interact in a shared virtual space via their respective avatars. In some implementations, the vehicle 3502 is in wireless communication with one or more other servers or game engines to enable the one or more occupants of the vehicle 3502 to interact with participants from other vehicles or other non-vehicle locations in a shared virtual environment via their respective avatars.

Figure 36:
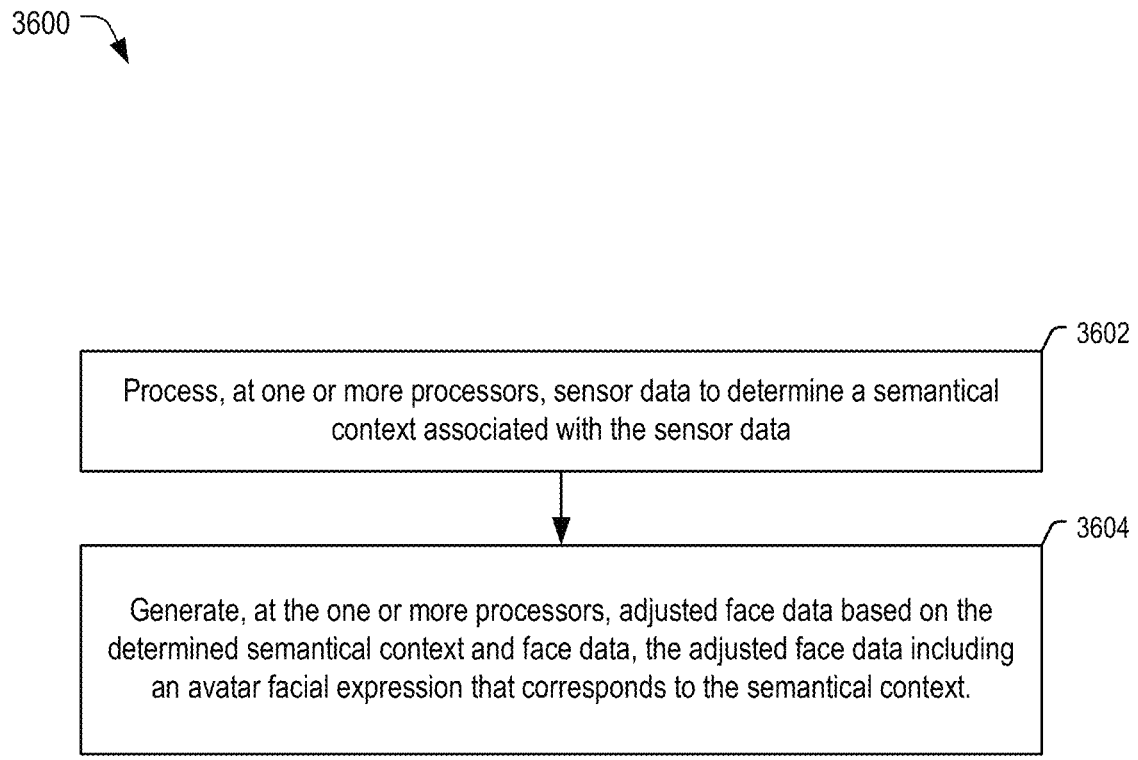
FIG. 36 is a diagram of a particular implementation of a method of avatar generation, in accordance with some examples of the present disclosure.

Referring to FIG. 36, a particular implementation of a method 3600 of avatar generation is shown. In a particular aspect, one or more operations of the method 3600 are performed by the device 102, such as by the one or more processors 116.

The method 3600 includes, at 3602, processing, at one or more processors, sensor data to determine a semantical context associated with the sensor data. For example, the feature data generator 120 processes the sensor data 106 to determine the semantical context 122.

The method 3600 also includes, at 3604, generating, at the one or more processors, adjusted face data based on the determined semantical context and face data, the adjusted face data including an avatar facial expression that corresponds to the semantical context. For example, the face data adjuster 130 generates the adjusted face data 134 based on the face data 132 and the feature data 124 corresponding to the semantical context 122, and the adjusted face data 134 corresponds to the avatar facial expression 156 that is based on the semantical context 122.

In some implementations, the sensor data includes audio data (e.g., the audio data 204), and the semantical context is based on a meaning of speech (e.g., the speech 258) represented in the audio data. In some implementations, the sensor data includes audio data, and the semantical context is at least partially based on an audio event (e.g., the audio event 272) detected in the audio data. In some implementations, the sensor data includes motion sensor data (e.g., the motion sensor data 212), and the semantical context is based on a motion (e.g., the motion 2240) represented in the motion sensor data.

By generating adjusted face data for the avatar based on the semantical context, the avatar can be generated with higher accuracy, enhanced realism, or both, and thus may improve a user experience. In addition, avatar generation can be performed with reduced latency, which improves operation of the avatar generation device. Further, reduced latency also increases the perceived realism of the avatar, further enhancing the user experience.

The method of FIG. 36 may be implemented by a field-programmable gate array (FPGA) device, an application-specific integrated circuit (ASIC), a processing unit such as a central processing unit (CPU), a digital signal processing unit (DSP), a controller, another hardware device, firmware device, or any combination thereof. As an example, the method of FIG. 36 may be performed by a processor that executes instructions, such as described with reference to FIG. 37.

Figure 37:
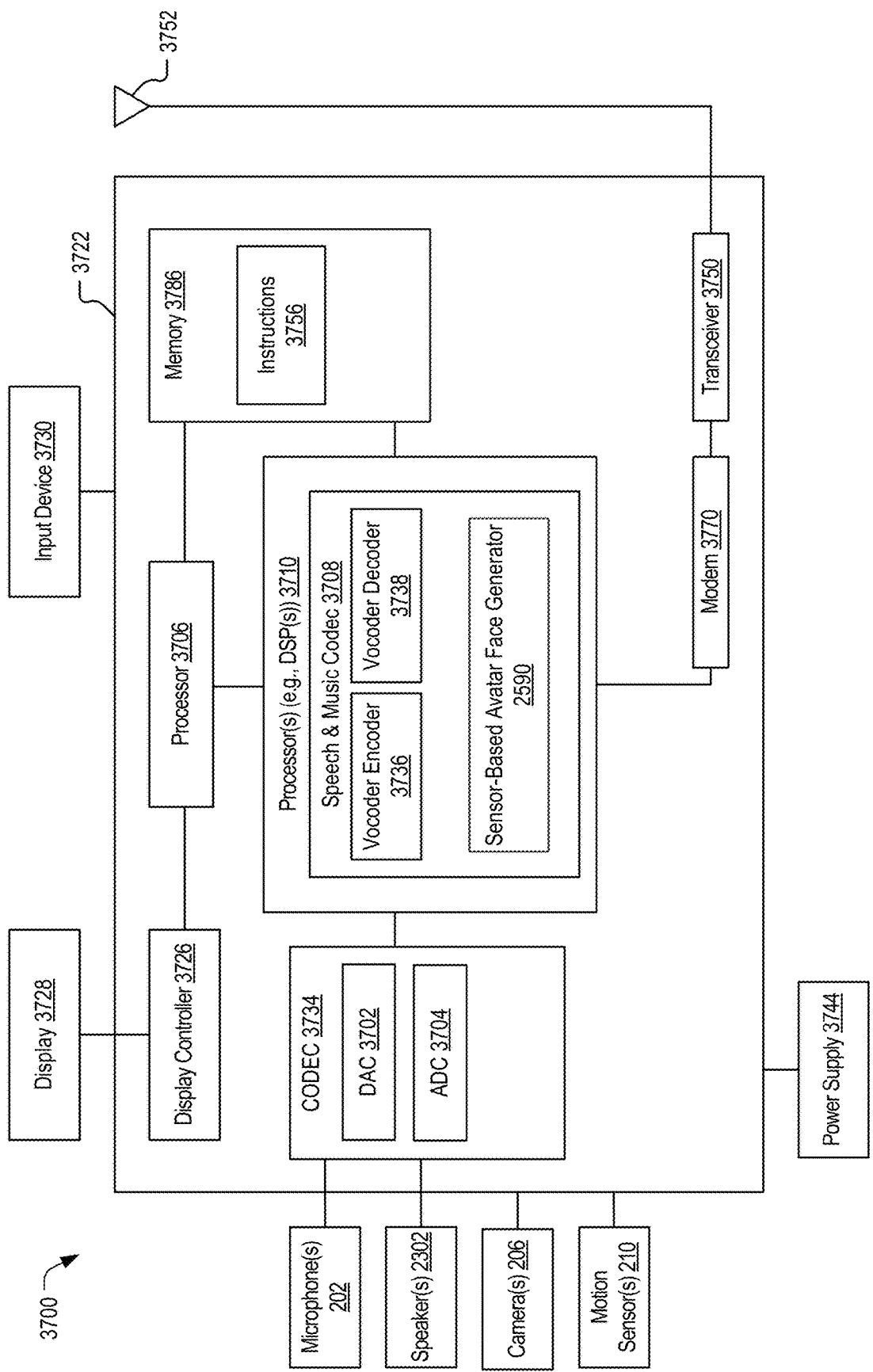
FIG. 37 is a block diagram of a particular illustrative example of a device that is operable to generate adjusted face data corresponding to an avatar facial expression based on a semantical context associated with motion sensor data, in accordance with some examples of the present disclosure.

Referring to FIG. 37, a block diagram of a particular illustrative implementation of a device is depicted and generally designated 3700. In various implementations, the device 3700 may have more or fewer components than illustrated in FIG. 37. In an illustrative implementation, the device 3700 may correspond to the device 102. In an illustrative implementation, the device 3700 may perform one or more operations described with reference to FIGS. 1-36.

In a particular implementation, the device 3700 includes a processor 3706 (e.g., a CPU). The device 3700 may include one or more additional processors 3710 (e.g., one or more DSPs). In a particular aspect, the processor(s) 116 corresponds to the processor 3706, the processors 3710, or a combination thereof. The processors 3710 may include a speech and music coder-decoder (CODEC) 3708 that includes a voice coder ("vocoder") encoder 3736, a vocoder decoder 3738, the sensor-based avatar face generator 2590, or a combination thereof.

The device 3700 may include a memory 3786 and a CODEC 3734. The memory 3786 may include instructions 3756, that are executable by the one or more additional processors 3710 (or the processor 3706) to implement the functionality described with reference to the sensor-based avatar face generator 2590. In a particular aspect, the memory 3786 corresponds to the memory 112 and the instructions 3756 include the instructions 114. The device 3700 may include a modem 3770 coupled, via a transceiver 3750, to an antenna 3752. The modem 3770 may be configured to transmit a signal to a second device (not shown). According to a particular implementation, the modem 3770 may correspond to the modem 140 of FIG. 1.

The device 3700 may include a display 3728 coupled to a display controller 3726. The one or more speakers 2302 and the one or more microphones 202 may be coupled to the CODEC 3734. The CODEC 3734 may include a digital-to-analog converter (DAC) 3702, an analog-to-digital converter (ADC) 3704, or both. In a particular implementation, the CODEC 3734 may receive analog signals from the one or more microphones 202, convert the analog signals to digital signals using the analog-to-digital converter 3704, and provide the digital signals to the speech and music codec 3708. The speech and music codec 3708 may process the digital signals, and the digital signals may further be processed by the sensor-based avatar face generator 2590. In a particular implementation, the speech and music codec 3708 may provide digital signals to the CODEC 3734. The CODEC 3734 may convert the digital signals to analog signals using the digital-to-analog converter 3702 and may provide the analog signals to the one or more speakers 2302.

In a particular implementation, the device 3700 may be included in a system-in-package or system-on-chip device 3722. In a particular implementation, the memory 3786, the processor 3706, the processors 3710, the display controller 3726, the CODEC 3734, and the modem 3770 are included in a system-in-package or system-on-chip device 3722. In a particular implementation, an input device 3730, the one or more cameras 206, the one or more motion sensors 210, and a power supply 3744 are coupled to the system-on-chip device 3722. Moreover, in a particular implementation, as illustrated in FIG. 37, the display 3728, the input device 3730, the one or more speakers 2302, the one or more microphones 202, the one or more cameras 206, the one or more motion sensors 210, the antenna 3752, and the power supply 3744 are external to the system-on-chip device 3722. In a particular implementation, each of the display 3728, the input device 3730, the one or more speakers 2302, the one or more microphones 202, the one or more cameras 206, the one or more motion sensors 210, the antenna 3752, and the power supply 3744 may be coupled to a component of the system-on-chip device 3722, such as an interface or a controller.

The device 3700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, an extended reality (XR) device, a base station, a mobile device, or any combination thereof.

In conjunction with the described implementations, an apparatus includes means for processing sensor data to generate feature data. For example, the means for processing sensor data to generate feature data can correspond to the feature data generator 120, the processor 116 or the components thereof, the audio unit 222, the image unit 226, the motion unit 238, the audio network 310, the speech signal processing unit 410, the ASR-based processing unit 510, the deep learning model 610 based on self-supervised learning, the audio/image network 710, the event detector 810 or 1402, the context prediction network 910, the prediction override unit 930, the prediction verifier 1030, the context-based future speech prediction network 1210, 1310, or 1410, the representation generator 1230 or 1430, the speech representation generator 1330, the processor 3706, the processor(s) 3710, one or more other circuits or components configured to process the sensor data to generate feature data, or any combination thereof.

The apparatus also includes means for generating adjusted face data based on the feature data, the adjusted face data corresponding to an avatar facial expression that is based on a semantical context. For example, the means for generating the adjusted face data can correspond to the processor(s) 116, the face data adjuster 130, the encoder portion 1504, the decoder portion 1502, the neural network 1630 or 1730, the neural network layers 1702 or 1704, the concatenate unit 1804, the fusion unit 1904, the fusion neural network 2004, the processor 3706, the processor(s) 3710, one or more other circuits or components configured to generate the adjusted face data, or any combination thereof.

In some implementations, a non-transitory computer-readable medium (e.g., a computer-readable storage device, such as the memory 3786) includes instructions (e.g., the instructions 3756) that, when executed by one or more processors (e.g., the one or more processors 3710 or the processor 3706), cause the one or more processors to process sensor data (e.g., the sensor data 106) to generate feature data (e.g., the feature data 124). The instructions, when executed by the one or more processors, also cause the one or more processors generate adjusted face data (e.g., the adjusted face data 134) based on the feature data, the adjusted face data corresponding to an avatar facial expression (e.g., the avatar facial expression 156) that is based on a semantical context (e.g., the semantical context 122).

This disclosure includes the following first set of examples.

According to Example 1, a device includes: a memory configured to store instructions; and one or more processors configured to: process sensor data to determine a semantical context associated with the sensor data; and generate adjusted face data based on the determined semantical context and face data, the adjusted face data including an avatar facial expression that corresponds to the semantical context.

Example 2 includes the device of Example 1, wherein the one or more processors are further configured to: generate the face data based on image data corresponding to a user's face; and generate, based on the adjusted face data, a representation of an avatar having the avatar facial expression.

Example 3 includes the device of Example 1 or Example 2, wherein the sensor data includes audio data, and wherein the semantical context is based on a meaning of speech represented in the audio data.

Example 4 includes the device of Example 3, wherein the semantical context is based on a meaning of a word detected in the speech.

Example 5 includes the device of Example 3 or Example 4, wherein the semantical context is based on a meaning of at least one phrase or sentence detected in the speech.

Example 6 includes the device of Example 3, wherein the semantical context is based on a meaning of at least one word, phrase, or sentence detected in the speech.

Example 7 includes the device of any of Example 3 to Example 6, wherein the speech includes at least a portion of a conversation, and wherein the semantical context is based on a characteristic of the conversation.

Example 8 includes the device of Example 7, wherein the characteristic includes a type of relationship between participants of the conversation.

Example 9 includes the device of Example 7 or Example 8, wherein the characteristic includes a social context of the conversation.

Example 10 includes the device of Example 7, wherein the characteristic includes at least one of a type of relationship between participants of the conversation or a social context of the conversation.

Example 11 includes the device of any of Example 1 to Example 10, wherein the sensor data includes audio data, and wherein the semantical context is based on an emotion associated with speech represented in the audio data.

Example 12 includes the device of Example 10, wherein the one or more processors are configured to process the audio data to predict the emotion.

Example 13 includes the device of Example 11 or Example 12, wherein the adjusted face data causes the avatar facial expression to represent the emotion.

Example 14 includes the device of any of Example 1 to Example 13, wherein the semantical context is based on motion sensor data that is included in the sensor data.

Example 15 includes the device of Example 14, wherein the one or more processors are configured to determine the semantical context based on comparing a motion represented in the motion sensor data to at least one motion threshold.

Example 16 includes the device of Example 14 or Example 15, wherein the motion sensor data includes head-tracker data that indicates at least one of a movement or an orientation of a user's head.

Example 17 includes the device of Example 14 or Example 15, wherein the motion sensor data includes head-tracker data that indicates a movement of a user's head.

Example 18 includes the device of Example 14 or Example 15, wherein the motion sensor data includes head-tracker data that indicates an orientation of a user's head.

Example 19 includes the device of any of Example 1 to Example 18, wherein the sensor data includes audio data, and wherein the semantical context is at least partially based on an audio event detected in the audio data.

Example 20 includes the device of any of Example 1 to Example 19, wherein the one or more processors are configured to determine the avatar facial expression further based on a user profile.

Example 21 includes the device of any of Example 1 to Example 20, wherein the one or more processors are configured to predict a future expression of a user based on the semantical context.

Example 22 includes the device of any of Example 1 to Example 21, wherein the one or more processors are configured to determine a magnitude of the avatar facial expression.

Example 23 includes the device of any of Example 1 to Example 22, further including one or more microphones configured to generate audio data that is included in the sensor data.

Example 24 includes the device of any of Example 1 to Example 23, further including one or more motion sensors configured to generate motion data that is included in the sensor data.

Example 25 includes the device of any of Example 1 to Example 24, further including one or more cameras configured to generate image data that is included in the sensor data.

Example 26 includes the device of any of Example 1 to Example 25, further including a display device configured to display, based on the adjusted face data, a representation of an avatar having the avatar facial expression.

Example 27 includes the device of any of Example 1 to Example 26, further including a modem, wherein at least a portion of the sensor data is received from a second device via the modem.

Example 28 includes the device of any of Example 1 to Example 27, wherein the one or more processors are further configured to send a representation of an avatar having the avatar facial expression to a second device.

Example 29 includes the device of any of Example 1 to Example 28, wherein the one or more processors are integrated in an extended reality device.

According to Example 30, a method of avatar generation includes: processing, at one or more processors, sensor data to determine a semantical context associated with the sensor data; and generating, at the one or more processors, adjusted face data based on the determined semantical context and face data, the adjusted face data including an avatar facial expression that corresponds to the semantical context.

Example 31 includes the method of Example 30, wherein the sensor data includes audio data, and wherein the semantical context is based on a meaning of speech represented in the audio data.

Example 32 includes the method of Example 31, wherein the semantical context is based on a meaning of a word detected in the speech.

Example 33 includes the method of Example 31 or Example 32, wherein the semantical context is based on a meaning of at least one phrase or sentence detected in the speech.

Example 34 includes the method of any of Example 31 to Example 33, wherein the speech includes at least a portion of a conversation, and wherein the semantical context is based on a characteristic of the conversation.

Example 35 includes the method of Example 34, wherein the characteristic includes a type of relationship between participants of the conversation.

Example 36 includes the method of Example 34 or Example 35, wherein the characteristic includes a social context of the conversation.

Example 37 includes the method of any of Example 30 to Example 36, wherein the sensor data includes audio data, and wherein the semantical context is based on an emotion associated with speech represented in the audio data.

Example 38 includes the method of Example 37, further including processing the audio data to predict the emotion.

Example 39 includes the method of Example 37 or Example 38, wherein the adjusted face data causes the avatar facial expression to represent the emotion.

Example 40 includes the method of any of Example 30 to Example 39, wherein the sensor data includes audio data, and wherein the semantical context is at least partially based on an audio event detected in the audio data.

Example 41 includes the method of any of Example 30 to Example 40, wherein the sensor data includes motion sensor data, and wherein the semantical context is based on a motion represented in the motion sensor data.

Example 42 includes the method of Example 41, wherein the semantical context is determined based on comparing a motion represented in the motion sensor data to at least one motion threshold.

Example 43 includes the method of Example 41 or Example 42, wherein the motion sensor data includes head-tracker data that indicates at least one of a movement or an orientation of a user's head.

Example 44 includes the method of any of Example 30 to 43, further including: generating the face data based on image data corresponding to a user's face; and generating, based on the adjusted face data, a representation of an avatar having the avatar facial expression.

Example 45 includes the method of any of Example 30 to Example 44, wherein the avatar facial expression is determined further based on a user profile.

Example 46 includes the method of any of Example 30 to Example 45, further including receiving, from one or more microphones, audio data that is included in the sensor data.

Example 47 includes the method of any of Example 30 to Example 46, further including receiving motion data that is included in the sensor data.

Example 48 includes the method of any of Example 30 to Example 47, further including receiving, from one or more cameras, image data that is included in the sensor data.

Example 49 includes the method of any of Example 30 to Example 48, further including displaying, based on the adjusted face data, a representation of an avatar having the avatar facial expression.

Example 50 includes the method of any of Example 30 to Example 49, further including receiving at least a portion of the sensor data from a second device.

Example 51 includes the method of any of Example 30 to Example 50, further including sending a representation of an avatar having the avatar facial expression to a second device.

Example 52 includes the method of any of Example 30 to Example 51, wherein the one or more processors are integrated in an extended reality device.

According to Example 53, a device includes: a memory configured to store instructions; and a processor configured to execute the instructions to perform the method of any of Example 30 to Example 52.

According to Example 54, a non-transitory computer-readable medium includes instructions that, when executed by one or more processors, cause the one or more processors to perform the method of any of Example 30 to Example 52.

According to Example 55, an apparatus includes means for carrying out the method of any of Example 30 to Example 52.

According to Example 56, a non-transitory computer-readable medium includes: instructions that, when executed by one or more processors, cause the one or more processors to: process sensor data to determine a semantical context associated with the sensor data; and generate adjusted face data based on the determined semantical context and face data, the adjusted face data including an avatar facial expression that corresponds to the semantical context.

Example 57 includes the non-transitory computer-readable medium of Example 56, wherein the sensor data includes audio data, and wherein the semantical context is based on a meaning of speech represented in the audio data.

Example 58 includes the non-transitory computer-readable medium of Example 57, wherein the semantical context is based on a meaning of a word detected in the speech.

Example 59 includes the non-transitory computer-readable medium of Example 57 or Example 58, wherein the semantical context is based on a meaning of at least one phrase or sentence detected in the speech.

Example 60 includes the non-transitory computer-readable medium of any of Example 57 to Example 59, wherein the speech includes at least a portion of a conversation, and wherein the semantical context is based on a characteristic of the conversation.

Example 61 includes the non-transitory computer-readable medium of Example 60, wherein the characteristic includes a type of relationship between participants of the conversation.

Example 62 includes the non-transitory computer-readable medium of Example 60 or Example 61, wherein the characteristic includes a social context of the conversation.

Example 63 includes the non-transitory computer-readable medium of any of Example 56 to Example 62, wherein the sensor data includes audio data, and wherein the semantical context is based on an emotion associated with speech represented in the audio data.

Example 64 includes the non-transitory computer-readable medium of Example 63, wherein the instructions are further configured to cause the one or more processors to process the audio data to predict the emotion.

Example 65 includes the non-transitory computer-readable medium of Example 63 or Example 64, wherein the adjusted face data causes the avatar facial expression to represent the emotion.

Example 66 includes the non-transitory computer-readable medium of any of Example 56 to Example 65, wherein the sensor data includes audio data, and wherein the semantical context is at least partially based on an audio event detected in the audio data.

Example 67 includes the non-transitory computer-readable medium of any of Example 56 to Example 66, wherein the sensor data includes motion sensor data, and wherein the semantical context is based on a motion represented in the motion sensor data.

Example 68 includes the non-transitory computer-readable medium of Example 67, wherein the semantical context is determined based on comparing a motion represented in the motion sensor data to at least one motion threshold.

Example 69 includes the non-transitory computer-readable medium of Example 67 or Example 68, wherein the motion sensor data includes head-tracker data that indicates at least one of a movement or an orientation of a user's head.

Example 70 includes the non-transitory computer-readable medium of any of Example 56 to 69, wherein the instructions are further configured to cause the one or more processors to: generate the face data based on image data corresponding to a user's face; and generate, based on the adjusted face data, a representation of an avatar having the avatar facial expression.

Example 71 includes the non-transitory computer-readable medium of any of Example 56 to Example 70, wherein the avatar facial expression is determined further based on a user profile.

Example 72 includes the non-transitory computer-readable medium of any of Example 56 to Example 71, wherein the instructions are further configured to cause the one or more processors to receive, from one or more microphones, audio data that is included in the sensor data.

Example 73 includes the non-transitory computer-readable medium of any of Example 56 to Example 72, wherein the instructions are further configured to cause the one or more processors to receive motion data that is included in the sensor data.

Example 74 includes the non-transitory computer-readable medium of any of Example 56 to Example 73, wherein the instructions are further configured to cause the one or more processors to receive, from one or more cameras, image data that is included in the sensor data.

Example 75 includes the non-transitory computer-readable medium of any of Example 56 to Example 74, wherein the instructions are further configured to cause the one or more processors to display, based on the adjusted face data, a representation of an avatar having the avatar facial expression.

Example 76 includes the non-transitory computer-readable medium of any of Example 56 to Example 75, wherein the instructions are further configured to cause the one or more processors to receive at least a portion of the sensor data from a second device.

Example 77 includes the non-transitory computer-readable medium of any of Example 56 to Example 76, wherein the instructions are further configured to cause the one or more processors to send a representation of an avatar having the avatar facial expression to a second device.

Example 78 includes the non-transitory computer-readable medium of any of Example 56 to Example 77, wherein the one or more processors are integrated in an extended reality device.

According to Example 79, an apparatus includes: means for processing sensor data to determine a semantical context associated with the sensor data; and means for generating adjusted face data based on the determined semantical context and face data, the adjusted face data including an avatar facial expression that corresponds to the semantical context.

Example 80 includes the apparatus of Example 79, wherein the sensor data includes audio data, and wherein the semantical context is based on a meaning of speech represented in the audio data.

Example 81 includes the apparatus of Example 80, wherein the semantical context is based on a meaning of a word detected in the speech.

Example 82 includes the apparatus of Example 80 or Example 81, wherein the semantical context is based on a meaning of at least one phrase or sentence detected in the speech.

Example 83 includes the apparatus of any of Example 80 to Example 82, wherein the speech includes at least a portion of a conversation, and wherein the semantical context is based on a characteristic of the conversation.

Example 84 includes the apparatus of Example 83, wherein the characteristic includes a type of relationship between participants of the conversation.

Example 85 includes the apparatus of Example 83 or Example 84, wherein the characteristic includes a social context of the conversation.

Example 86 includes the apparatus of any of Example 79 to Example 85, wherein the sensor data includes audio data, and wherein the semantical context is based on an emotion associated with speech represented in the audio data.

Example 87 includes the apparatus of Example 86, further including means for processing the audio data to predict the emotion.

Example 88 includes the apparatus of Example 86 or Example 87, wherein the adjusted face data causes the avatar facial expression to represent the emotion.

Example 89 includes the apparatus of any of Example 79 to Example 88, wherein the sensor data includes audio data, and wherein the semantical context is at least partially based on an audio event detected in the audio data.

Example 90 includes the apparatus of any of Example 79 to Example 89, wherein the sensor data includes motion sensor data, and wherein the semantical context is based on a motion represented in the motion sensor data.

Example 91 includes the apparatus of Example 90, wherein the semantical context is determined based on comparing a motion represented in the motion sensor data to at least one motion threshold.

Example 92 includes the apparatus of Example 90 or Example 91, wherein the motion sensor data includes head-tracker data that indicates at least one of a movement or an orientation of a user's head.

Example 93 includes the apparatus of any of Example 79 to 92, further including: means for generating the face data based on image data corresponding to a user's face; and means for generating, based on the adjusted face data, a representation of an avatar having the avatar facial expression.

Example 94 includes the apparatus of any of Example 79 to Example 93, wherein the avatar facial expression is determined further based on a user profile.

Example 95 includes the apparatus of any of Example 79 to Example 94, further including means for obtaining audio data that is included in the sensor data.

Example 96 includes the apparatus of any of Example 79 to Example 95, further including means for obtaining motion data that is included in the sensor data.

Example 97 includes the apparatus of any of Example 79 to Example 96, further including means for obtaining image data that is included in the sensor data.

Example 98 includes the apparatus of any of Example 79 to Example 97, further including means for displaying, based on the adjusted face data, a representation of an avatar having the avatar facial expression.

Example 99 includes the apparatus of any of Example 79 to Example 98, further including means for receiving at least a portion of the sensor data from a second device.

Example 100 includes the apparatus of any of Example 79 to Example 99, further including means for sending a representation of an avatar having the avatar facial expression to a second device.

Example 101 includes the apparatus of any of Example 79 to Example 100, integrated in an extended reality device.

This disclosure includes the following second set of examples.

According to Example 1, a device includes: a memory configured to store instructions; and one or more processors configured to: process sensor data to generate feature data; and generate adjusted face data based on the feature data, the adjusted face data corresponding to an avatar facial expression that is based on a semantical context.

Example 2 includes the device of Example 1, wherein the one or more processors are further configured to: process image data corresponding to a user's face to generate face data; generate the adjusted face data further based on the face data; and generate, based on the adjusted face data, a representation of an avatar having the avatar facial expression.

Example 3 includes the device of Example 1 or Example 2, wherein the sensor data includes audio data, and wherein the semantical context is based on a meaning of speech represented in the audio data.

Example 4 includes the device of Example 3, wherein the semantical context is based on a meaning of a word detected in the speech.

Example 5 includes the device of Example 3 or Example 4, wherein the semantical context is based on a meaning of at least one phrase or sentence detected in the speech.

Example 6 includes the device of any of Example 3 to Example 5, wherein the speech includes at least a portion of a conversation, and wherein the semantical context is based on a characteristic of the conversation.

Example 7 includes the device of Example 6, wherein the characteristic includes a type of relationship between participants of the conversation.

Example 8 includes the device of Example 6 or Example 7, wherein the characteristic includes a social context of the conversation.

Example 9 includes the device of any of Example 1 to Example 8, wherein the sensor data includes audio data, and wherein the semantical context is based on an emotion associated with speech represented in the audio data.

Example 10 includes the device of Example 9, wherein the one or more processors are configured to process the audio data to predict the emotion.

Example 11 includes the device of Example 9 or Example 10, wherein the adjusted face data causes the avatar facial expression to represent the emotion.

Example 12 includes the device of any of Example 1 to Example 11, wherein the semantical context is based on motion sensor data that is included in the sensor data.

Example 13 includes the device of Example 12, wherein the one or more processors are configured to determine the semantical context based on comparing a motion represented in the motion sensor data to at least one motion threshold.

Example 14 includes the device of Example 12 or Example 13, wherein the motion sensor data includes head-tracker data that indicates at least one of a movement or an orientation of a user's head.

Example 15 includes the device of Example 12 or Example 13, wherein the motion sensor data includes head-tracker data that indicates a movement of a user's head.

Example 16 includes the device of Example 12 or Example 13, wherein the motion sensor data includes head-tracker data that indicates an orientation of a user's head.

Example 17 includes the device of any of Example 1 to Example 16, wherein the sensor data includes audio data, and wherein the semantical context is at least partially based on an audio event detected in the audio data.

Example 18 includes the device of any of Example 1 to Example 17, wherein the one or more processors are configured to determine the avatar facial expression further based on a user profile.

Example 19 includes the device of any of Example 1 to Example 18, further including one or more microphones configured to generate audio data that is included in the sensor data.

Example 20 includes the device of any of Example 1 to Example 19, further including one or more motion sensors configured to generate motion data that is included in the sensor data.

Example 21 includes the device of any of Example 1 to Example 20, further including one or more cameras configured to generate image data that is included in the sensor data.

Example 22 includes the device of any of Example 1 to Example 21, further including a display device configured to display, based on the adjusted face data, a representation of an avatar having the avatar facial expression.

Example 23 includes the device of any of Example 1 to Example 22, further including a modem, wherein at least a portion of the sensor data is received from a second device via the modem.

Example 24 includes the device of any of Example 1 to Example 23, wherein the one or more processors are further configured to send a representation of an avatar having the avatar facial expression to a second device.

Example 25 includes the device of any of Example 1 to Example 24, wherein the one or more processors are integrated in an extended reality device.

According to Example 26, a method of avatar generation includes: processing, at one or more processors, sensor data to generate feature data; and generating, at the one or more processors, adjusted face data based on the feature data, the adjusted face data corresponding to an avatar facial expression that is based on a semantical context.

Example 27 includes the method of Example 26, wherein the sensor data includes audio data, and wherein the semantical context is based on a meaning of speech represented in the audio data.

Example 28 includes the method of Example 27, wherein the semantical context is based on a meaning of a word detected in the speech.

Example 29 includes the method of Example 27 or Example 28, wherein the semantical context is based on a meaning of at least one phrase or sentence detected in the speech.

Example 30 includes the method of any of Example 27 to Example 29, wherein the speech includes at least a portion of a conversation, and wherein the semantical context is based on a characteristic of the conversation.

Example 31 includes the method of Example 30, wherein the characteristic includes a type of relationship between participants of the conversation.

Example 32 includes the method of Example 30 or Example 31, wherein the characteristic includes a social context of the conversation.

Example 33 includes the method of any of Example 26 to Example 32, wherein the sensor data includes audio data, and wherein the semantical context is based on an emotion associated with speech represented in the audio data.

Example 34 includes the method of Example 33, further including processing the audio data to predict the emotion.

Example 35 includes the method of Example 33 or Example 34, wherein the adjusted face data causes the avatar facial expression to represent the emotion.

Example 36 includes the method of any of Example 26 to Example 35, wherein the sensor data includes audio data, and wherein the semantical context is at least partially based on an audio event detected in the audio data.

Example 37 includes the method of any of Example 26 to Example 36, wherein the sensor data includes motion sensor data, and wherein the semantical context is based on a motion represented in the motion sensor data.

Example 38 includes the method of Example 37, wherein the semantical context is determined based on comparing a motion represented in the motion sensor data to at least one motion threshold.

Example 39 includes the method of Example 37 or Example 38, wherein the motion sensor data includes head-tracker data that indicates at least one of a movement or an orientation of a user's head.

Example 40 includes the method of any of Example 26 to 39, further including: processing image data corresponding to a user's face to generate face data; generating the adjusted face data further based on the face data; and generating, based on the adjusted face data, a representation of an avatar having the avatar facial expression.

Example 41 includes the method of any of Example 26 to Example 40, wherein the avatar facial expression is determined further based on a user profile.

Example 42 includes the method of any of Example 26 to Example 41, further including receiving, from one or more microphones, audio data that is included in the sensor data.

Example 43 includes the method of any of Example 26 to Example 42, further including receiving motion data that is included in the sensor data.

Example 44 includes the method of any of Example 26 to Example 43, further including receiving, from one or more cameras, image data that is included in the sensor data.

Example 45 includes the method of any of Example 26 to Example 44, further including displaying, based on the adjusted face data, a representation of an avatar having the avatar facial expression.

Example 46 includes the method of any of Example 26 to Example 45, further including receiving at least a portion of the sensor data from a second device.

Example 47 includes the method of any of Example 26 to Example 46, further including sending a representation of an avatar having the avatar facial expression to a second device.

Example 48 includes the method of any of Example 26 to Example 47, wherein the one or more processors are integrated in an extended reality device.

According to Example 49, a device includes: a memory configured to store instructions; and a processor configured to execute the instructions to perform the method of any of Example 26 to Example 48.

According to Example 50, a non-transitory computer-readable medium includes instructions that, when executed by one or more processors, cause the one or more processors to perform the method of any of Example 26 to Example 48.

According to Example 51, an apparatus includes means for carrying out the method of any of Example 26 to Example 48.

According to Example 52, a non-transitory computer-readable medium includes: instructions that, when executed by one or more processors, cause the one or more processors to: process sensor data to generate feature data; and generate adjusted face data based on the feature data, the adjusted face data corresponding to an avatar facial expression that is based on a semantical context.

According to Example 53, an apparatus includes: means for processing sensor data to generate feature data; and means for generating adjusted face data based on the feature data, the adjusted face data corresponding to an avatar facial expression that is based on a semantical context.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
 a memory configured to store sensor data including a conversation represented in audio data; and
 one or more processors coupled to the memory, the one or more processors configured to:
  process the sensor data to determine;
   a semantical context associated with the sensor data, the semantical context based at least in part on a social context associated with the conversation and a type of relationship between a user and one or more participants in the conversation; and
   a magnitude of an emotion that corresponds to the semantical context; and
  generate adjusted face data for the user based on the semantical context and face data, the adjusted face data including an avatar facial expression based on the emotion and the magnitude of the emotion.

2. The device of claim 1, wherein the one or more processors are further configured to:
 generate the face data based on image data corresponding to a person's face; and
 generate, based on the adjusted face data, a representation of an avatar having the avatar facial expression.

3. The device of claim 1, wherein the semantical context is further based on a meaning of speech of the user represented in the audio data.

4. The device of claim 3, wherein the semantical context is based on a meaning of at least one word, phrase, or sentence detected in the speech.

5. The device of claim 1, wherein, based on a selected setting for a particular social context, the adjusted face data includes one or more visual facial cues not expressed by the user to make communication comfortable.

6. The device of claim 1, wherein, based on a selected setting for a particular social context, the adjusted face data does not express head tilt, eye focus, or both, that indicates inattention of the user during the conversation.

7. The device of claim 1, wherein the one or more processors are configured to save power by intermittent use of one or more cameras to augment the audio data.

8. The device of claim 1, wherein, in response to the emotion being a particular emotion and a determination indicating a professional social context, the one or more processors are configured to change the adjusted face data to reduce the magnitude of the particular emotion to a lower magnitude.

9. The device of claim 1, wherein the face data indicates laughter, wherein the adjusted face data for a laugh that expresses the emotion makes a mouth smile bigger and tightens eyes of the face, and wherein the adjusted face data for a loud laugh that expresses the emotion displays a large and open mouth and other increased facial aspects.

10. The device of claim 1, wherein the semantical context is further based on motion sensor data included in the sensor data.

11. The device of claim 10, wherein the one or more processors are configured to determine the semantical context based on comparing a motion represented in the motion sensor data to at least one motion threshold.

12. The device of claim 10, wherein the motion sensor data includes head-tracker data that indicates at least one of a movement or an orientation of a user's head.

13. The device of claim 1, wherein the one or more processors are configured to determine the magnitude of the emotion based on context, volume, tone, pitch, or combinations thereof, of speech in the audio data.

14. The device of claim 1, wherein the one or more processors are configured to determine the avatar facial expression further based on a user profile.

15. The device of claim 1, wherein the one or more processors are configured to predict a future expression of a user based on the semantical context.

16. The device of claim 1, wherein the adjusted face data is an override expression of a particular emotion based on user settings.

17. The device of claim 1, further comprising one or more microphones configured to generate audio data that is included in the sensor data.

18. The device of claim 1, further comprising one or more motion sensors configured to generate motion data that is included in the sensor data.

19. The device of claim 1, further comprising one or more cameras configured to generate image data that is included in the sensor data.

20. The device of claim 1, further comprising a display device configured to display, based on the adjusted face data, a representation of an avatar having the avatar facial expression.

21. The device of claim 1, further comprising a modem, wherein at least a portion of the sensor data is received from a second device via the modem.

22. The device of claim 1, wherein the one or more processors are further configured to send a representation of an avatar having the avatar facial expression to a second device.

23. The device of claim 1, wherein the one or more processors are integrated in an extended reality device.

24. A method of avatar generation, the method comprising:
 processing, at one or more processors, sensor data including a conversation represented in audio data to determine;
  a semantical context associated with the sensor data, the semantical context based at least in part on a social context associated with the conversation and a type of relationship between a user and one or more participants in the conversation; and a magnitude of an emotion that corresponds to the semantical context; and generating, at the one or more processors, adjusted face data for the user based on the semantical context and face data, the adjusted face data including an avatar facial expression based on the emotion and the magnitude of the emotion.

25. The method of claim 24, wherein the semantical context is further based on a meaning of speech of the user represented in the audio data.

26. The method of claim 24, further comprising reducing the magnitude of a particular emotion to a lower magnitude of the particular emotion based on the social context.

27. The method of claim 24, wherein the adjusted face data is an override expression for a particular emotion based on user settings.

28. The method of claim 24, wherein the sensor data includes motion sensor data, and wherein the semantical context is further based on a motion represented in the motion sensor data.

29. A non-transitory computer-readable medium comprising instructions that, when executed by one or more processors, cause the one or more processors to:

process sensor data including a conversation represented in audio data to determine:

a semantical context associated with the sensor data, the semantical context based at least in part on a social context associated with the conversation and a type of relationship between a user and one or more participants in the conversation; and a magnitude of an emotion that corresponds to the semantical context; and generate adjusted face data for the user based on the semantical context and face data, the adjusted face data including an avatar facial expression based on the emotion and the magnitude of the emotion.

30. An apparatus comprising:

means for processing sensor data including a conversation represented in audio data to determine:

a semantical context associated with the sensor data, the semantical context based at least in part on a social context associated with the conversation and a type of relationship between a user and one or more participants in the conversation; and a magnitude of an emotion that corresponds to the semantical context; and means for generating adjusted face data for the user based on the semantical context and face data, the adjusted face data including an avatar facial expression based on the emotion and the magnitude of the emotion.

* * * * *